United States Patent
Lam et al.

(10) Patent No.: US 6,671,774 B1
(45) Date of Patent: Dec. 30, 2003

(54) METHOD AND APPARATUS FOR PERFORMING SWAP ANALYSIS

(75) Inventors: Tao Kai Lam, Boston, MA (US); Orit Levin Michael, Newton, MA (US); Adnan Sahin, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 485 days.

(21) Appl. No.: 09/817,328

(22) Filed: Mar. 26, 2001

Related U.S. Application Data

(63) Continuation-in-part of application No. 09/709,077, filed on Nov. 10, 2000.

(51) Int. Cl.⁷ ................................................. B06F 12/00

(52) U.S. Cl. ........................... 711/112; 711/170; 710/8; 710/15; 710/104; 709/104

(58) Field of Search .............................. 709/104, 105, 709/324; 710/8, 15, 104, 6; 711/112, 165, 170; 714/47

(56) References Cited

U.S. PATENT DOCUMENTS

| | | | | |
|---|---|---|---|---|
| 5,983,316 A | * | 11/1999 | Norwood | 711/112 |
| 6,061,761 A | * | 5/2000 | Bachmat | 711/114 |
| 6,088,766 A | * | 7/2000 | Bachmat et al. | 711/114 |
| 6,108,748 A | * | 8/2000 | Ofek et al. | 711/112 |
| 6,189,071 B1 | * | 2/2001 | Bachmat | 711/114 |
| 6,237,063 B1 | * | 5/2001 | Bachmat et al. | 711/114 |
| 6,405,282 B1 | * | 6/2002 | Lam et al. | 711/112 |
| 2003/0028720 A1 | * | 2/2003 | Lam et al. | 711/112 |
| 2003/0065883 A1 | * | 4/2003 | Bachmat | 711/114 |

OTHER PUBLICATIONS www.EMC.com, "EMC Control Center—Storage Management," 2001.*
"Intra–Disk Swapping of Data Storage Volumes." U.S. application, Ser. No. 09/540,826, filed Mar. 31, 2000.
"Quality of Swaps of Data Storage Volumes" U.S. application Ser. No. 09/539,967, filed Mar. 31, 2000.
"Workload Analyzer and Optimizer Integration." U.S. application, Ser. No. 09/663,540, filed, Sep. 15, 2000.
"Correlation Criteria for Logical Volumes." U.S. application, Ser. No. 09/709,077, filed Nov. 10, 2000.
"Space Allocation in a Disk Array Storage Device." U.S. application, Ser. No. 09/501,419, filed Feb. 9, 2000.
"Load Balancing on Disk Array Storage Device." U.S. application, Ser. No. 09/396,253, filed Sep. 15, 1999.

(List continued on next page.)

*Primary Examiner*—Donald Sparks
*Assistant Examiner*—Christian P. Chace
(74) *Attorney, Agent, or Firm*—Choate, Hall & Stewart

(57) ABSTRACT

Described are techniques used in connection with determining one or more pairs of logical volumes (LVs) to increase the performance of storage devices by swapping these LVs. Future performance of the anticipated potential LV swap is determined in accordance with past performance data collected prior to actually performing the swap. Data is gathered for a first arrangement of data storage devices for a period of time. A proposed modification to the first arrangement, such as swapping LVs of data on one or more storage devices, is produced. A performance estimation is produced using past performance data for the one or more pairs of proposed LV swap candidates. The search for pairs of LV candidates is determined using an iterative technique in which earlier iterations attempt to produce candidates from a smaller, more focused pool of possible LVs. The pool of LVs is expanded upon subsequent iterations if earlier iterations using heuristics providing for a more focused search are unsuccessful.

91 Claims, 16 Drawing Sheets

OTHER PUBLICATIONS

"Maximizing Sequential Output in a Disk Array Storage Device." U.S. application, Ser. No. 09/396,275, filed Sep. 15, 1999.

"Mailbox for Controlling Storage Subsystem Reconfiguration." U.S. application, Ser. No. 09/396,146, filed Sep. 15, 1999.

"Load Balancing in Disk Array Storage Device." U.S. application, Ser. No. 09/396,253, filed Sep. 15, 1999.

"Method for Transparent Exchange of Logical Volumes in a Disk." U.S. application, Ser. No. 09/396,218, filed Sep. 15, 1999.

* cited by examiner

METHOD AND APPARATUS FOR PERFORMING SWAP ANALYSIS

CROSS REFERENCE TO RELATED APPLICATIONS

This application is a continuation-in-part of U.S. patent application Ser. No. 09/709,077, filed on Nov. 10, 2000, entitled "Correlation Criteria for Logical Volumes", by Levin Michael et al.

BACKGROUND

1. Technical Field

This application generally relates to computer systems, and more particularly to computer system performance.

2. Description of Related Art

Computer systems may include different resources that may be used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations, such as data read and write operations and also administrative tasks, such as data backup and mirroring operations. In connection with the I/O operations, a data storage system may include a data storage optimizer used in connection with improving device performance. The data storage optimizer may perform a variety of tasks, for example, determining what logical volumes (LVs) may be candidates for swapping to increase performance of the data storage system in accordance with one or more predetermined criteria. A "swap plan", as may be produced by a data storage optimizer, may identify one or more pairs of LVs having data included therein to be swapped. It should be noted that the LVs and their data may be swapped in accordance with the swap plan.

Generally, pairs of LV candidates may be identified using different techniques, which when the LVs of pair are exchanged, are expected to contribute to the reduction of any imbalance of load requirements for a plurality of physical disk storage devices. These different techniques may determine pairs of LV candidates in accordance with a variety of statistics and device-related characteristics, such as, for example, LV size, and device activity.

It may be desirable that this technique be efficient in determining pairs of candidates to minimize computer resources that may be used in calculations, for example, and statistics gathering processes to determine an activity level associated with each LV. Additionally, it may be desirable to use criteria to determine pairs of LV candidates such that, when swapped, will have a tendency to increase system performance for a predetermined period of time. In other words, it may be desirable to determine pairs of candidates using criteria that has a degree of reliability in predicting that subsequent system performance will be increased for a time period when using, for example, statistics gathered in connection with past activity level.

Thus, it may be advantageous to load balance servicing of host requests by determining pairs of LV candidates using an efficient technique in accordance with criteria that will provide for increased system performance.

SUMMARY OF THE INVENTION

In accordance with principles of the invention is a method for execution in a computer system for determining a pair of exchangeable logical volumes. A first logical volume is determined as an active logical volume by incrementally examining various portions of a list of logical volumes sorted in accordance with performance data. A second logical volume is determined as an inactive volume by incrementally examining various portions of a list of logical volumes sorted in accordance with performance data. The first and second logical volumes are exchanged.

In accordance with another aspect of the invention is a computer program product for determining a pair of exchangeable logical volumes. Machine executable code is included for determining a first logical volume as an active logical volume by incrementally examining various portions of a list of logical volumes sorted in accordance with performance data. Machine executable code is included for determining a second logical volume as an inactive volume by incrementally examining various portions of a list of logical volumes sorted in accordance with performance data. The computer program product also includes machine executable code for exchanging the first and second logical volumes.

In accordance with yet another aspect of the invention is a method executed in a computer system for determining a pair of exchangeable logical volumes. A first logical volume is determined as an active logical volume by incrementally examining various portions of a list of logical volumes sorted in accordance with a first set of performance data. The first set of performance data includes correlation activity between logical volumes residing on a same disk. A second logical volume is determined as an inactive logical volume by incrementally examining various portions of a list of logical volumes sorted in accordance with a second set of performance data. The second set of performance data including low activity criteria in which activity of a logical volume is compared to a predetermined threshold of activity level. The first and said second logical volumes are exchanged.

In accordance with another aspect of the invention is a method for determining a pair of exchangeable logical volumes. A first logical volume is determined as an active logical volume by examining a list of logical volumes sorted in accordance with a first set of performance data. The first set of performance data includes correlation activity between logical volumes residing on a same disk. A second logical volume is determined as an inactive logical volume by examining a list of logical volumes sorted in accordance with a second set of performance data. The first and second logical volumes are exchanged.

In accordance with another aspect of the invention is a method executed in a computer system for determining a pair of exchangeable logical volumes. A first logical volume is determined as an active logical volume by examining a list of logical volumes sorted in accordance with a first set of performance data. A second logical volume is determined as an inactive logical volume by examining a list of logical volumes sorted in accordance with a second set of performance data. The second set of performance data including low activity criteria in which activity of a logical volume is compared to a predetermined threshold of activity level. The first and the second logical volumes are exchanged.

In accordance with another aspect of the invention is a computer program product for determining a pair of exchangeable logical volumes that includes machine executable code for determining a first logical volume as an active logical volume by incrementally examining various portions of a list of logical volumes sorted in accordance with a first set of performance data. The first set of performance data including correlation activity between logical volumes residing on a same disk. Also included is machine executable code for determining a second logical volume as an inactive logical volume by incrementally examining various portions of a list of logical volumes sorted in accordance with a second set of performance data. The second set of performance data including low activity criteria in which activity of a logical volume is compared to a predetermined threshold of activity level. Machine executable code is also included for exchanging said first and said second logical volumes.

In accordance with yet another aspect of the invention is a computer program product for determining a pair of exchangeable logical volumes that includes machine executable code for determining a first logical volume as an active logical volume by examining a list of logical volumes sorted in accordance with a first set of performance data. The first set of performance data including correlation activity between logical volumes residing on a same disk. Also included is machine executable code for determining a second logical volume as an inactive logical volume by examining a list of logical volumes sorted in accordance with a second set of performance data, the second set of performance data including low activity criteria in which activity of a logical volume is compared to a predetermined threshold of activity level, and machine executable code for exchanging said first and said second logical volumes.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF PREFERRED EMBODIMENT

Figure 1:
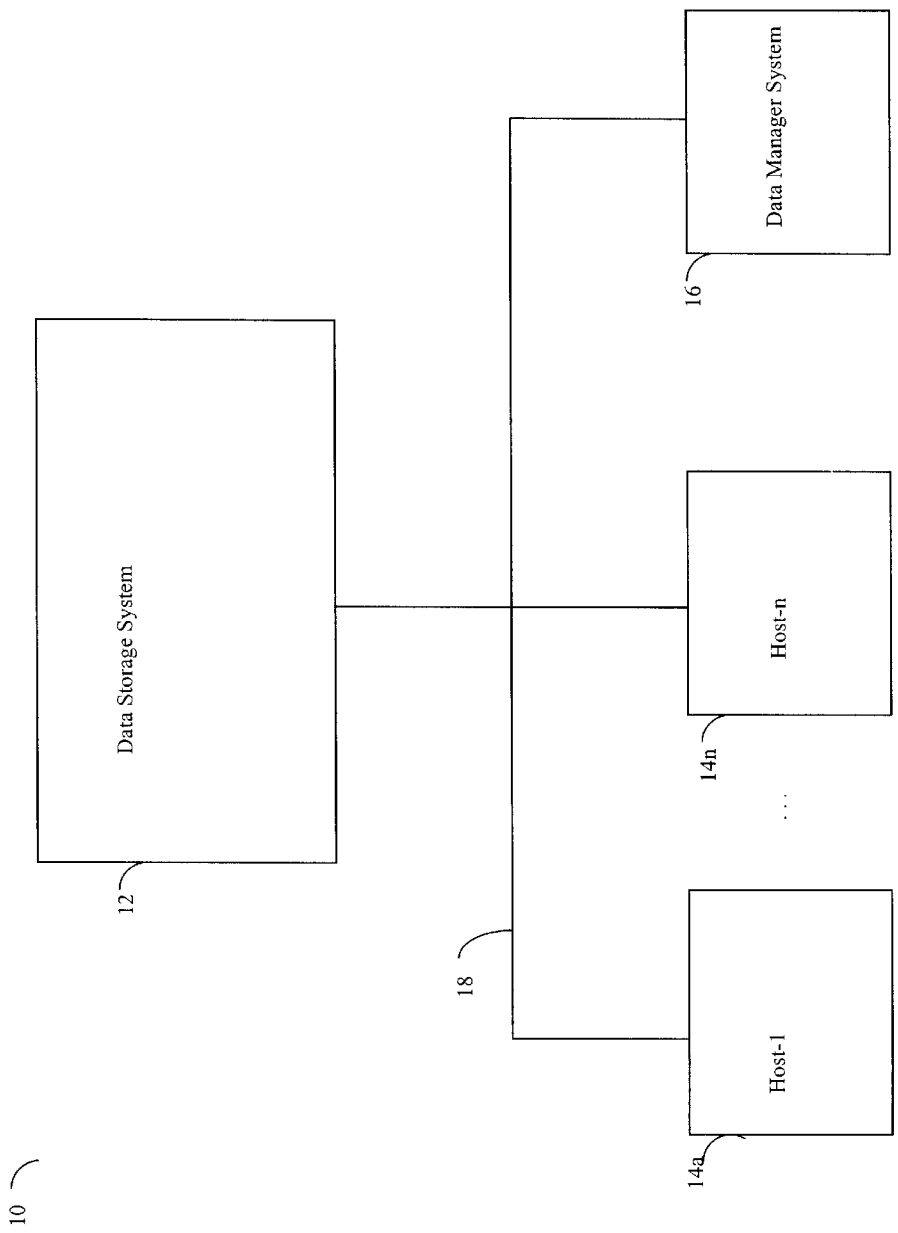
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a–14n may issue an I/O request to the data storage system 12 to perform a data operation. For example, an application executing on one of the host computers 14a–14n may perform a backup, mirroring or other administrative operation and may do so while performing I/O requests to the data storage system 12.

Figure 2:
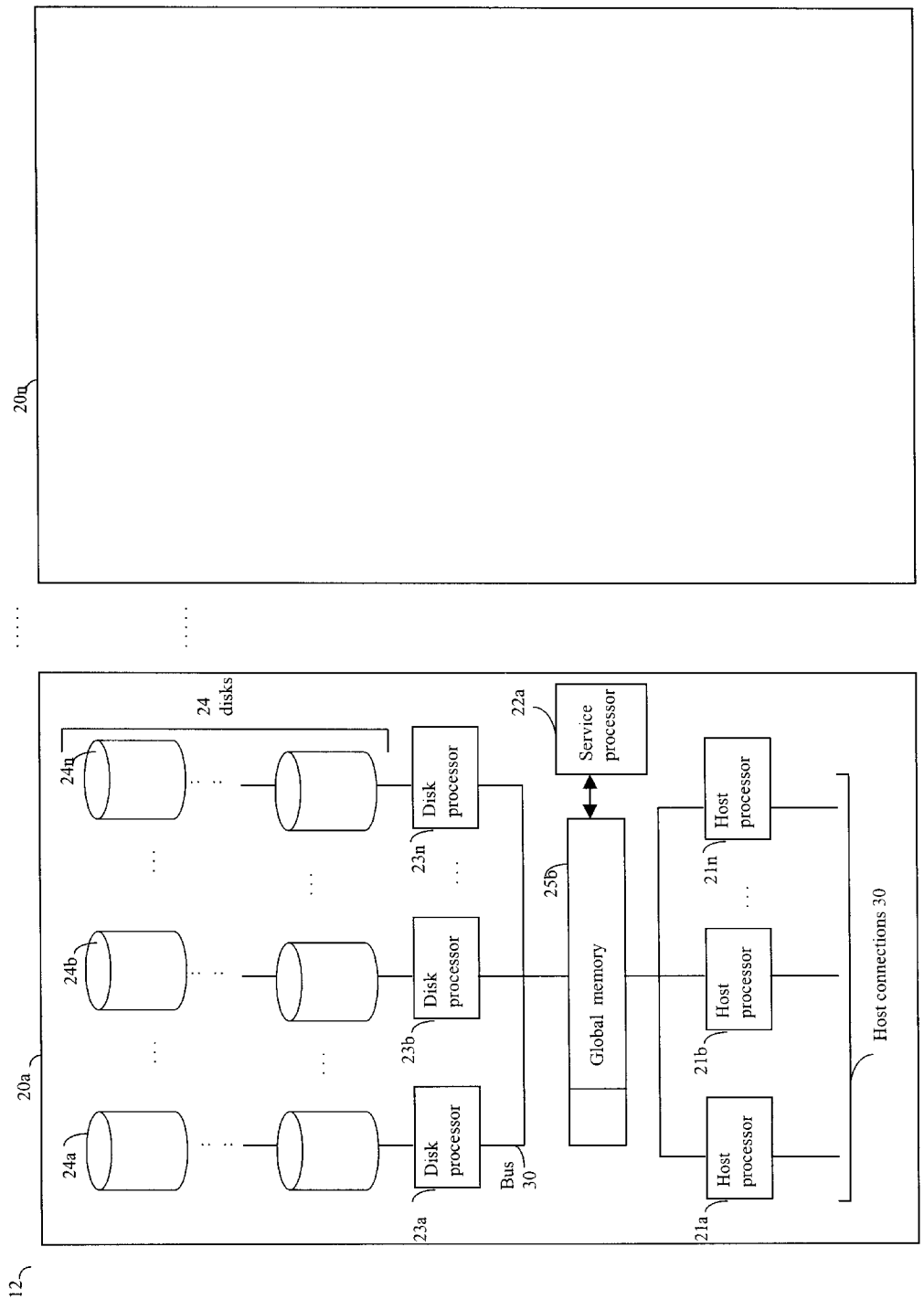
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are N Symmetrix™ storage systems 20a–20n as manufactured by EMC Corporation of Hopkinton, Mass. In this particular example, each of the Symmetrix™ storage systems 20a–20n may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a–20n may be resources included in an embodiment of the computer system 10 to provide storage services to, for example, host computer systems and/or the data manager system.

Each of the Symmetrix™ systems, such as 20a, may include a plurality of disks, such as the arrangement 24 consisting of n rows of disks 24a–24n. In this arrangement, each row of disks may be connected to a disk processor or director responsible for the backend management of operations to and from a portion of the disks 24. In the Symmetrix™ system 20a, a single disk processor, such as 23a, is responsible for the management of a row of disks, such as row 24a. Each of the disk processors or directors 23a–23n are connected, for example, by a bus 30 to a cache that includes a particular portion designated as global memory 25b. The disk processors 23a–23n may perform data operations to and from the global memory 25b, for example, in communications with other disk processors or directors, and other components of the system 20a. Generally, the global memory 25b may be used in facilitating communications between components in the system 20a.

An embodiment of the Symmetrix™ system 20a may include a service processor 22a used to manage and monitor the system 20a. In one embodiment, the service processor 22a may be used in collecting performance data, for example, regarding the I/O performance in connection with system 20a. This performance data may relate to, for example, performance measurements of an I/O request as may be made from the different host computer systems 14a–14n. This performance data may be gathered and stored, for example, in the global memory and/or other storage area.

The system 20a may also include one or more host processors or directors 21a–21n. Each of these host processors or directors may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Figure 3:
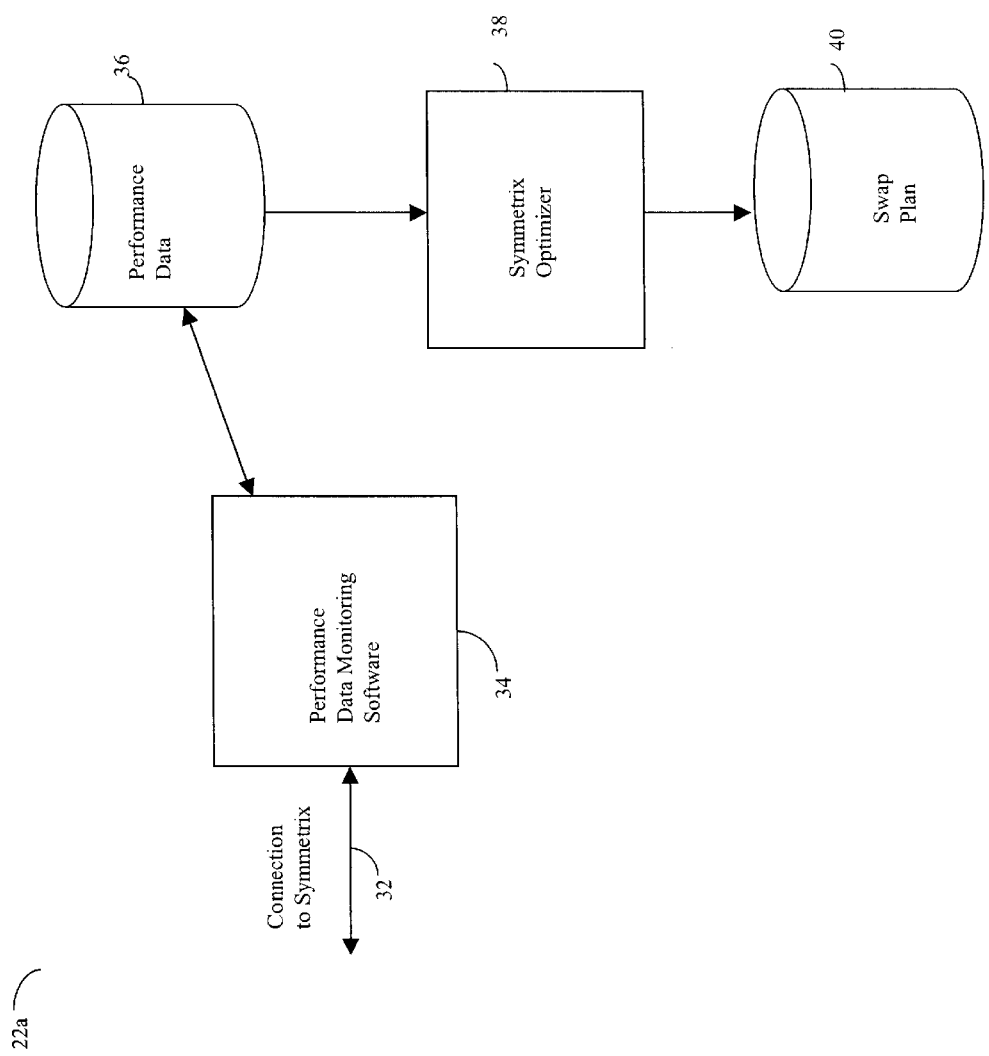
FIG. 3 is an example of an embodiment of software that may be included in a service processor of a data storage system.

Referring now to FIG. 3, shown is an example of software that may be included in a service processor such as 22a. It should be noted that the service processor may be any one of a variety of commercially available processors, such as an Intel-based processor, and the like. Although what is described herein with reference to FIG. 3 shows details of software that may reside in a particular service processor 22a, similar software components may exist in each of the other service processors such as 22n associated with other Symmetrix™ storage systems. In other embodiments, this software may also reside on any of the host systems 14a–14n, or even on the data manager system 16.

Included in the service processor 22a is performance data monitoring software 34 which gathers performance data about the Symmetrix™ system 20a through the connection 32. The performance data monitoring software 34 gathers and stores performance data in the performance data file 36. This performance data 36 may serve as an input to the Symmetrix™ optimizer 38 which attempts to increase the performance of I/O operations, such as those V/O operations associated with data storage devices 24a–24n and Symmetrix™ system 20a. The Symmetrix™ optimizer 38 may take into consideration various types of parameters and performance data 36 in an attempt to optimize particular metrics associated with performance of the Symmetrix™ system 20a. These may include, for example, seek time, service time, response time, and the like. For example, the Symmetrix™ optimizer 38 may attempt to decrease the response time associated with I/O requests. It may use the performance data 36 to produce as an output swap plan 40. The swap plan 40 may include, for example, a description of which logical volumes on a particular data storage device such as 24a may be swap candidates.

Each of the data storage devices 24a–24n may be physical devices, such as disks, and may be organized and segmented into one or more logical volumes (LVs). Particular I/O requests may be associated with particular LVs. In accordance with the performance data 36, the Symmetrix™ Optimizer 38 may output a Swap Plan 40 using different heuristics in an attempt to increase the performance of a Symmetrix™ system 20a. An embodiment may include a Symmetrix™ system that automatically performs a swap in accordance with a swap plan. An embodiment may also allow for user selection and determination of whether to implement a swap plan.

In one embodiment, the Symmetrix™ optimizer 38 may output a swap plan 40 to be implemented within the Symmetrix™ system 20a. Generally, the swap plan 40 may be implemented for example, by swapping LVs and their associated data on one or more physical devices. This swapping operation may be performed, for example, as a background task by scheduling the swapping as a background operation with a lower priority than that associated with I/O requests as may be issued from the one or more host computer systems in the computer system 10.

An embodiment may also provide for output of a swap plan and a graphical illustration of a hypothetical implementation of the swap plan, for example, in accordance with past performance data. An embodiment may include performance data collection and analysis software which executes to gather such data. In one embodiment, the performance data may be gathered by the optimizer, such as the Symmetrix™ optimizer 38, and stored in a global memory area, or elsewhere. As described elsewhere herein in more detail, in one embodiment, a service processor may be viewed as a "window to the world" used, for example, in monitoring and viewing such performance data, the swap plan, and the graphical illustration of hypothetically implementing the swap plan.

It should be noted that software of the data manager system 16 may reside and be executed upon a service processor and/or other processors of one or more Symmetrix™ systems and/or host systems. It should also be noted that an embodiment of the Symmetrix™ optimizer may reside completely upon, and be executed solely upon, a service processor of one or more Symmetrix™ systems collecting data using, for example, the global memory. An embodiment may also include an optimizer that resides, and is executed, on any one or more processors in a Symmetrix™ system and/or host computer and/or other processor of the computer system 10.

Figure 4:
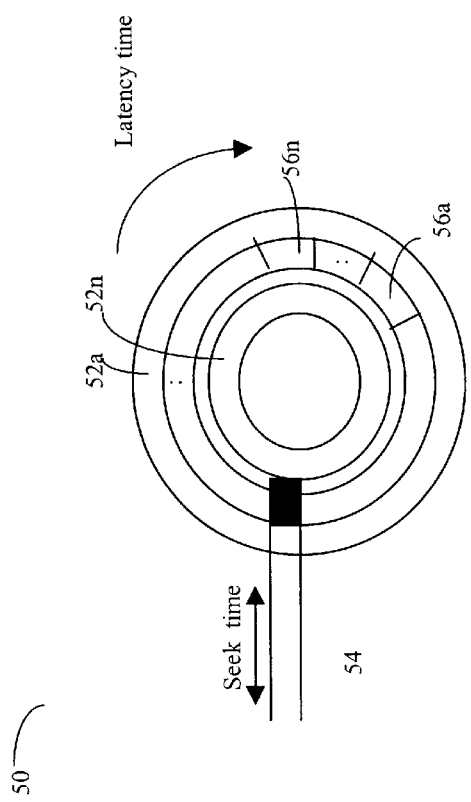
FIG. 4 is an example of an embodiment of a disk drive.

Referring now to FIG. 4, shown is an example of an embodiment of a disk drive having additional notations with regard to various performance statistics that may be gathered in connection therewith. The disk drive 50 may be represented in this example as including a plurality of cylinders such as 52a to 52n. In this example, each cylinder is represented as a circle in which the different cylinders are represented as a series of concentric circles in the representation 50. The read/write head as included in the arm 54 is positioned over one of the plurality of tracks in connection with data transfers of the device. Seek time may generally be described as the time associated with positioning the read/write head of the arm 54 over the proper cylinder associated with the data transfer. Another time component associated with the data transfer is the latency time which is the amount of time, once a particular cylinder is found, for positioning the read/write head to the beginning of the extent of data on a particular track of the cylinder. In this particular example, the extent of data may be denoted as a portion of a cylinder, such as 56a through 56n. Generally, another component associated with the data transfer is the time needed to transfer the data from the physical medium of the disk to the disk buffer. This "transfer time" is dependent on the amount of data and the location of the track with respect to the center of the disk. It may be summarized that the "access time" associated with a disk ("disk access time") may be the mathematical sum of the "seek time" (time associated with finding a particular cylinder), "latency time" (time associated with finding a particular position within a cylinder for a data portion), and the "transfer time" (as may generally be described as the amount of time it actually, takes once a particular data position is located, for actually transferring the data to a target location).

It should be noted that the latency and transfer times may be obtained per LV, and, if so, the time as associated with a disk is the sum of times associated with each LV included in a disk. The seek time may be calculated per disk. Additionally, an access time may be associated with data gathered for a particular time interval or period.

Various formulae that represent these values, as may be used, for example in determining "access time", and other statistics that may be gathered in connection with disk performance are included in U.S. Pat. No. 6,061,761, filed Oct. 6, 1997 to Bachmat which is herein incorporated by reference.

It should also be noted that an embodiment may include any one of a variety of calculations and formulae to be used in connection with determining these time quantities. For example, one embodiment uses the equation for determining disk seek time as described in equation (6) U.S. application Ser. No. 09/396,253, pending, as filed on Sep. 19, 1999, for "Load Balancing On Disk Array Storage Device". Statistics on the number of accesses to LVs are collected at periodic time intervals. For each sample time interval, the seek time, $T(seek)_d$, for a given disk drive, d, segregated into N logical volumes, is computed according to:

$$T(seek)_d = \left[ \frac{\sum_{\substack{i,j \\ i \neq j}} T_{i,j} * A_i * A_j}{\sum_{k=1}^{N} A_k} \right] \quad \text{(Equation 1A)}$$

in which $T_{i,j}$ is the time for the disk head to seek between a given pair, (i, j), of logical volumes on the disk drive, d, wherein $1 \leq i \leq N$, $1 \leq j < N$, and $i \neq j$, and $A_i$ and $A_j$ are the respective weighted activities, also known elsewhere herein as the optimizer activity level or LV activity from the sample time wherein the sum of $A_k$ for all values of k, $1 \leq k \leq N$, represents the total number of weighted accesses to the physical disk storage device, d. In one embodiment, approximations for some of the quantities of this formulae, such as $T_{ij}$, may be utilized in determining disk seek time. For example, $T_{ij}$ may be approximated by:

$$u + v\alpha^{|address(i) - address(j)|} \quad \text{(Equation 1B)}$$

in which u, v, and $\alpha$ are constants and i and j are variable quantities. The addresses of the logical volumes i and j may be determined, for example, by using the address associated with the center of each logical volume. The constants u, v, and $\alpha$ in the foregoing formula for approximating $T_{ij}$ may be derived from using a least-squares curve fitting routine of data points obtained from different recorded seek times associated with each pair data points for all possible combinations of gigabyte increments. For example, for a 4 gigabyte storage device, times are recorded for each pair of data points, for all possible combinations of (0,4), (0,3), (0,2), (0,1), (1,0), (1,2) . . . and the like. The least squares curve fitting technique may be used for curve fitting in connection with these data points. An embodiment may also use other techniques in connection with determining one or more of the time quantities.

An embodiment may gather and use data collected and stored in the service processor such that the Optimizer 38 may use these formulae and the data in connection therewith in determining pairs of LVs and their associated data that may be swapped.

Figure 5:
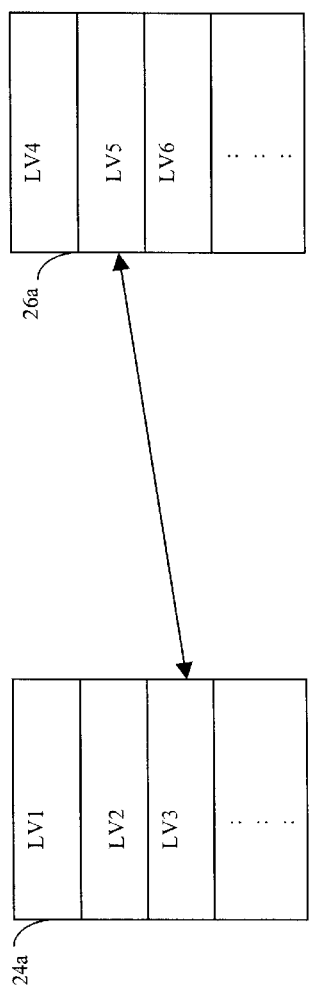
FIG. 5 is an example of two LVs that may be swapped.

Referring now to FIG. 5, shown is an example of an embodiment of a representation of "LVs" that may be associated with and included in data storage devices. In this particular example, data storage device 24a may include a plurality of "LVs" such as LV1 through LV3, and data storage device 26a may include a plurality of other "LVs", such as LV4 through LV6. In accordance with performance statistics, a pair of LVs may be determined, such as LV3 and LV5, such that the "LVs" and data included in each of the "LVs" may be swapped in an attempt to increase the performance of the particular devices, such as 24a and 26a. System performance increases may be determined using any one or more of a variety of statistics and thresholds that may vary with each particular embodiment. A more detailed example of in connection with system performance evaluation of an embodiment is described in more detail elsewhere herein.

One technique that may be used in connection with the Optimizer is a predictive technique in that an assumption is made with regard to statistics collected on past activity. This past activity and data in connection therewith may be used to predict future activities. In other words, in connection with the activity of various storage devices, such as the Symmetrix™ storage systems, if a particular swap of "LVs" is performed in accordance with past activity, and it is determined that this swap will enhance system performance, system performance may generally remain in this improved performance state for a predetermined time period.

What will now be presented are various formulae and statistics in connection with determining whether a pair of LVs are correlated and to what extent they are correlated, for example, as described in pending U.S. patent application Ser. No. 09/709,077, filed on Nov. 10, 2000, entitled "Correlation Criteria for Logical Volumes", by Levin Michael et al., which is herein incorporated by reference. Generally, by a correlated pair of LVs, what is meant is two LVs that exhibit similar time dependent behavior. For example, both LVs in a pair may be highly active in the same time period and inactive at another time period. According to research as performed by EMC Corporation in connection with Symmetrix™ systems, if an LV pair was "strongly correlated" at one point in time, then in approximately 70% of Symmetrix™ systems, the performance of the two LVs will most likely be at least "weakly correlated" for several weeks that follow. It should be noted that equations and thresholds for the foregoing "strongly correlated" and "weakly correlated" activity levels of two LVs are described in more detail elsewhere herein.

For a given time interval, for each LV, the Optimizer may calculate activity per second in connection with various I/O requests, for example, as:

LV activity=(1*# of read requests+0.5*# of write requests++ 0.25*# of prefetched tracks)/(time of interval)   (Equation 2)

The foregoing formula represents a weighted activity level in which a factor is associated with the different types of I/O requests and accesses included therein. This is called LV activity unit in pending U.S. patent application Ser. No. 09/709,077 filed on Nov. 10, 2000, entitled "Correlation Criteria for Logical Volumes", by Levin Michael et al. which is herein incorporated by reference. In the foregoing equation, the number of read requests corresponds to the number of read-miss accesses. "Prefetched tracks" may refer to the number of sequential read accesses, for example, as may be performed in connection with prefetching more than one portion of data for a request for one portion of data. Other embodiments may include different I/O requests and use different weighting factors. It should be noted that the data used in connection with determining LV activity as may be calculated above may be obtained, for example, from the performance data monitoring software as described elsewhere herein that may be included in an embodiment of a service processor associated with a Symmetrix™ system.

What will now be described are determination of various inactive or low activity level classifications in accordance with threshold values as may be included in one particular embodiment. Other thresholds may be specified and used in other embodiments. In this instance, a ZERO and LOW activity level are defined as being associated with LVs of relatively little activity, for example, as may be determined using the foregoing weighted formula for optimizer activity. An LV may be classified as having ZERO activity level if it has no associated activity for a defined time period. In one embodiment, an LV may be classified as having LOW activity level in accordance with the following definition:

a) The calculated LV activity level using Equation 2 did not exceed the level of 0.1 I/O weighted optimizer activity per second more than twice for a defined time period, and b) At each cross or occurrence, if any, of a level of 0.1 from a) above, the LV activity level is <1 and, also the LV activity level is <(0.1*maximum activity level of all LV associated with a Symmetrix™ system for the same defined time period). In another embodiment, the thresholds and multipliers may differ appropriately.

LVs classified as ZERO or LOW are good candidates for swapping with a busy LV. In accordance with previous research, it was determined that the activity level of these volumes remain LOW or ZERO for a given period of time.

Generally, if an LVs activity qualifies as LOW in accordance with the foregoing definition, it generally means that there is insufficient statistical information to make any inferences or conclusions with regard to correlation activities of other LVs.

Mathematically, a correlation coefficient generally refers to the linear relationship between two variables. Similar concepts of correlation, as described elsewhere herein, will now be described with relevance to the relationship between two LVs.

It should be noted that, in order for the correlation information between two LVs to be meaningful, each of the LVs must have an activity level more than a predetermined level of weighted optimizer activity per second. The number of times that this may occur in a defined time period may vary. For example, in one embodiment, the activity level is selected as one and the number of times to exceed this level is chosen to be three. In the description included herein, reference to "correlated pairs" assumes that both LVs of the pair satisfy this condition.

Different concepts of correlation may be associated with a pair of LVs may include some combination of statistics regarding AREA, PEAK Ratio (PEAKr), and a Correlation Coefficient. Each of these may be represented as follows:

Area: the ratio between the minimum area below both of the LVs' activity graphs and the maximum area below any one of them. Note that this may be graphically represented for summation over a defined time period represented in the following formulae with summation over i:

$$AREA = \frac{\sum_i \min(X_i, Y_i)}{\sum_i \max(X_i, Y_i)} \quad \text{(Equation 3)}$$

in which $X_i$ and $Y_i$ are the optimizer activity levels at the ith sample for LV X and Y respectively. The area ratio ranges between 0 and 1. Note that, from now on in this application, the notation above will be followed rather than that of Equation 1A.

Figure 6:
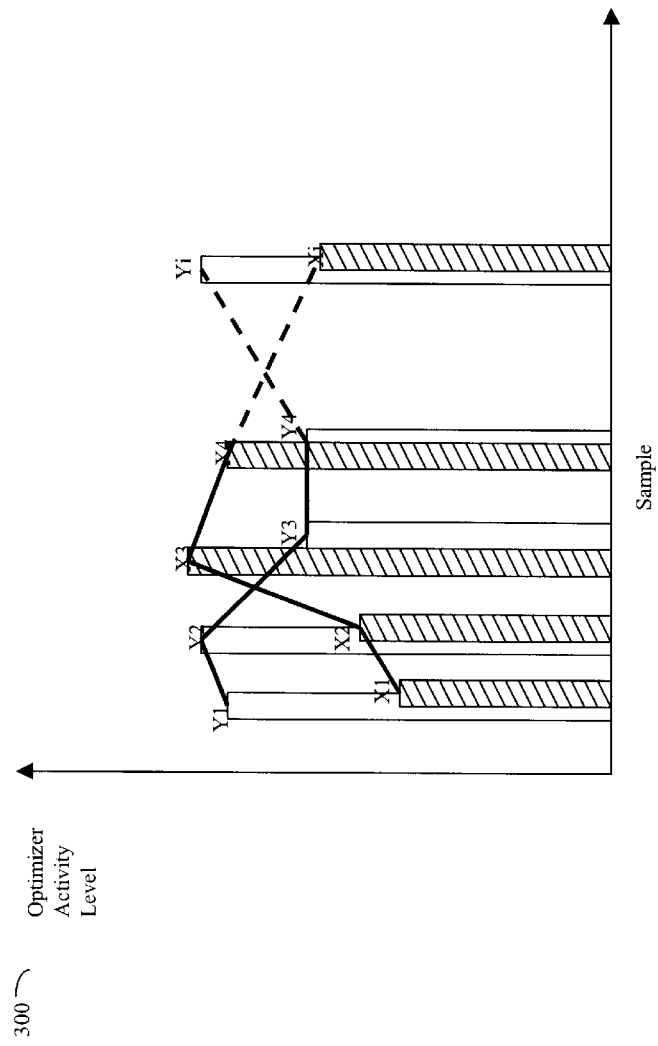
FIG. 6 is an example of a graphical representation of optimizer activity level for a pair of LVs.

Referring now to FIG. 6, shown is an example of a graphical representation of the AREA characteristic describing the behavior of a pair of LVs with respect to optimizer activity level. The graph 300 represents a series of data points of optimizer activity level for two LVs, X and Y, for given time periods. The data points form a curve and the Area, as represented in accordance with Equation 3, represent the associated area under a portion of the curve for a specified time interval summation over "i".

Peak ratio: the ratio between coincidental peaks and the total number of peaks of 2 LVs, X and Y that may be represented by:

$$PEAK_r = \frac{A}{B+C-D} \qquad \text{(Equation 4)}$$

in which:
   A and D each represent the number of coincidental peaks in X and Y;
   B represents the number of peaks in X; and
   C represents the number of peaks in Y;
in which coincidental peaks are peaks that occur in the same time sample. The peak ratio ranges between 0 and 1.
For example:
   Let's consider X has 6 peaks, and Y has 8 peaks. Also consider that 4 of the peaks in both X and Y occur at the same time. Then, $$PEAK_r = \frac{4}{(6+8)-4} = 0.4$$

In accordance with a determination of activity levels associated with each of the LVs, as may be determined using the weighted formula included herein, the number of "peaks" may be determined for a single LV, as may be used in computing PEAKr, in accordance with different values or thresholds regarding activity level for a time period. A peak within an activity graph may be defined as an activity level sample which is above the average activity level for its activity graph, plus a predetermined offset value. Alternatively, or in addition, a peak within an activity graph may be defined as an activity level sample at least as large as the average activity level for the activity graph multiplied by a predetermined value. Appropriate predetermined offset and/or multiplier values may be determined empirically for specific applications.

In one embodiment, the level of activity at a sample point, such as X3 and Y3 of FIG. 6, for an LV may be determined as a PEAK if:
   ((the activity level for that sample>=the average activity of this LV +1) OR
   (the activity level for that sample>=1.25* the average activity of this LV)) AND
   (the activity level for that sample>=the average activity of this LV +0.1)

The number of peaks determined in connection with the activity of an LV may be used in connection with computing the ratio of peaks between two LVs as in the PEAKr formula above.

Sharp peak: As disclosed herein, a coincidental sharp peak is determined to have occurred in the event that each of the following conditions are met:
   (1) The highest activity level samples of both logical volumes, during the relevant test period, occur at the same time.
   (2) The highest activity level sample of each logical volume is sufficiently greater than the next highest activity level sample. In one illustrative embodiment, the highest activity level sample of each logical volume must be at least as great as a product of a next highest activity level and a predetermined multiplier. Alternatively, the disclosed system could determine whether the difference between the highest and next highest activity samples is at least as great as a predetermined value for each logical volume.
   (3) A value of a correlation coefficient for the two logical volumes must be greater than a predetermined threshold correlation coefficient value.

In the event that all three of the above criteria are satisfied, the system may determine that the activities of the logical volumes associated with the activity graphs being compared are correlated according to the sharp peak criteria. In one embodiment for LVs X and Y, the following thresholds:
   If in a certain time sample two LVs, X and Y, each having a peak, and the activity level of each peak=maximum activity of the LVs X and Y, respectively, and each maximum is at least 5* the next highest activity level of the respective LV and the correlation coeff. of LV X and LV Y>=0.8, then the parameter sharp peak is set to TRUE. Otherwise, it is set to FALSE.

Correlation coefficient: A mathematical tool that is best to find linear relationships between two "independent" variables.

$$\text{Corr. Coff.} = \frac{\sum_i (X_i - \overline{X})(Y_i - \overline{Y})}{\sqrt{\sum_i (X_i - \overline{X})^2 \sum_i (Y_i - \overline{Y})^2}}$$

In view of the foregoing statistics regarding AREA, PEAKr, Sharp Peak, and Correlation Coefficient values for a pair of LVs, the relationship or strength of the correlation activity between a pair of LVs, X and Y, may be classified by different combinations of all or some of the disclosed correlation criteria. In one embodiment for example, three correlation levels for a pair of LVs may be defines as STRONGLY correlated, MEDIUM STRONGLY correlated, and WEAKLY correlated with regard to past recorded activity levels as follows:
   "STRONGLY" correlated if:
      1. AREA>=0.4 and PEAKr>=0.4.
   "MEDIUM STRONGLY" correlated if:
      2. AREA>=0.70 or (PEAKr>0.70 and the correlation coefficient>0.7).
   "WEAKLY CORRELATED" if any one of the following conditions holds true, such as a result of performing a logical ORing operation in accordance with the following conditions:
      1. AREA>=0.333 or PEAKr>=0.4. OR
      2. PEAKr>=0.333 and (Correlation Coefficient.>=0.1 or AREA>=0.1), OR
      3. Sharp peak=TRUE.

It should be noted that other embodiments may include a different number of correlation levels or classifications, and may also define each level using other values than as may be calculated in this embodiment.

According to research performed by the assignee of this patent, EMC Corporation, if an LV pair is "STRONGLY" correlated in one day, then in a majority of the Symmetrix™ systems, for example for approximately 70% of the Symmetrix™ systems, the LV activity for the pair of LVs will likely remain at least "WEAKLY" correlated for a time period of about a few weeks. One point as to the use and significance of this STRONG correlation factor determination may be described as follows.

From research that has been performed by the assignee of this patent, EMC Corporation, it may generally be determined that correlated pairs of LVs may provide some guarantee of predictable behavior for a pre-determined time period. Those LVs which may be described ZERO or LOW activity in terms of weighted read/write and prefetch requests are also predictable in that past performance may be used as some guarantee of a predictability with regard to future performance. Generally, the use of seek time from past performance as a predictable factor in determining future performance is less predictable than use of correlation pairs and ZERO and LOW predictable factors. In doing research, it has also been determined that there are not generally too many correlated LVs, such as STRONGLY correlated LVs. Additionally, the number of correlated LVs residing on the same physical disk is much smaller which makes achieving a goal of the optimizer to ensure that correlated LVs reside on different disks easier.

Another goal of the optimizer may be to reduce the access time and balance the performance or workload associated with the different devices such as the Symmetrix™ systems. What will now be described are techniques that may be used to identify, in accordance with access time and correlation, possible LV swap candidates and an attempt to increase system performance by more evenly distributing the load on the different disk storage devices in accordance with requests in accordance with disk access times and correlation determinations of pairs of LVs.

It should generally be noted that when a host system issues a read request, the request may be satisfied through the use of a cache that may reside in each Symmetrix™ storage system, such as 20a through 20n rather than performing a disk access, for example, such as accessing devices 24a through 24n. In the event that there is a cache hit, there is no disk access. However, for a read when there is a cache miss, one or more of the disks, such as 24a through 24n, may need to be accessed to satisfy the request. A write request may generally always result in a disk access, and may not be done immediately. In other words, when a request for a write to a particular device is issued, it may be buffered, for example, in the memory associated with a Symmetrix™ system such as 20a. The write to a particular device, such as 24a through 24n, may be scheduled in accordance with other I/O operations. It may be the function of the different Symmetrix™ system, such as 20a, to track and schedule different data operations in connection with different disks included under the control of the different Symmetrix™ systems. A prefetch technique may be employed in connection with data that may be stored on the various data devices such as 24a through 24n under the control of a particular Symmetrix™ system, such as 20a. In other words, different techniques may be implemented in connection with the Symmetrix™ system 20a. For example, in connection with prior read activity of a particular host, the Symmetrix™ system 20a may prefetch other subsequent data blocks in an attempt to minimize the response time experienced by a particular host in connection with subsequent read requests. These and other types of prefetching techniques for increasing system performance are well known to those skilled in the art and may be included in an embodiment.

The general technique that will be described in connection with determining pairs of LVs to be swapped is to identify a first LV on a busy disk and a second LV that has been determined as inactive or not busy, and then swap data associated with the first and second LVs. Thus, the system load of I/O requests may be shifted and evened out between the various disks on the system and the devices related thereto.

It should also be noted that in determining whether a disk has ZERO, LOW, or Busy activity levels may vary in accordance with each embodiment. In other words, different threshold levels of activity may be associated with a determination that the activity associated with an LV falls into the category of ZERO or LOW classification. Various threshold levels associated with ZERO and LOW activity level classifications are defined elsewhere herein as may be included in one embodiment with regard to Optimizer activity calculated in a weighted fashion as also described elsewhere herein.

Thus, what particular LVs are classified as ZERO and/or LOW may vary with the predetermined activity level thresholds in a particular embodiment. They may be determined in accordance with tuning of each system.

What will now be described is a technique for determining which LV pairs to swap using varying sized candidate pools and utilizing the foregoing statistical information regarding LV and disk activity, such as correlation levels, and access times.

Figure 7:
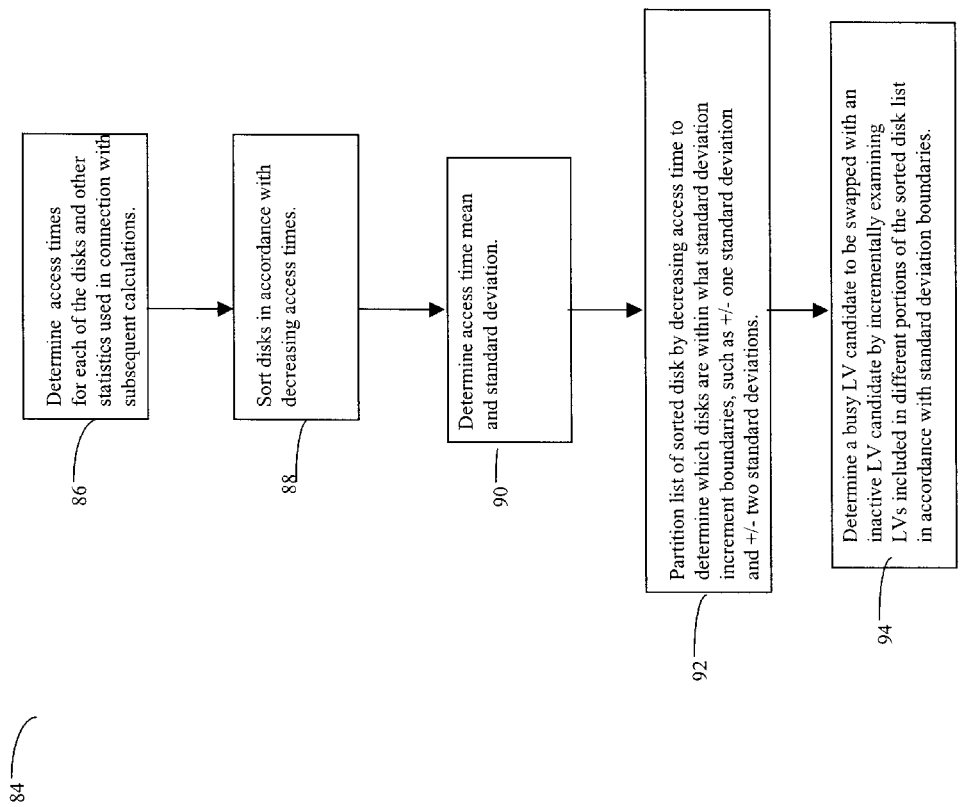
FIG. 7 is a flowchart of method steps of one embodiment for determining a pair of LV candidates.

Referring now to FIG. 7, shown is a flowchart of the steps generalizing the method for determining pairs of LV candidates. The flowchart 84 begins at step 86 where access times are computed for each of the disks. Recall that access time may be computed as an aggregate of three time components with regard to a particular disk including seek time, latency and transfer time. It should be noted that other statistics and calculations that may be needed in connection with performing other processing steps and evaluations may be performed at one particular point, or at various points in connection with processing of other steps. In following descriptions, associated calculations and data gathering steps, such as those, for example, in connection with determining access time, may be implied rather than as explicitly recited steps.

At step 88, the disks are sorted in accordance with decreasing access times. In other words, those elements towards the top of the list have the highest access times and those having the least access times or at the bottom of the list. Using this scheme, those disks identified at the top of the list are ones which may be considered busier than those towards the bottom of the list.

At step 90, access time mean and standard deviation are computed. As known to those skilled in the art, the access time mean and standard deviation may be computed using one of several statistical formulae. For example, the mean may represent the average of the different access times for each of the disks, and the standard deviation may generally represent the statistical variation of an element or a disk's access time with respect to the mean.

At step 92, the list of sorted disks by access time is partitioned to determine which disks are within what standard deviation increment boundaries, such as plus and minus one or two standard deviations. This will be explained in more detail in connection with the following figure. The goal of step 92 is to determine which disks with a particular access time fall within a certain boundary limitation of a standard deviation with regard to access time.

At step 94, a busy LV candidate to be swapped with an inactive LV candidate is determined by incrementally examining LVs included in different portions of the sorted disk list in accordance with standard deviation boundaries. As will be described in more paragraphs that follow, the pool of busy candidates and inactive candidates from which a single candidate of a swapped pair is selected may vary with each iteration of a technique that will be described in paragraphs that follow. In other embodiments, several candidates may be chosen. The general technique, as will be described in paragraphs that follow, is to examine a small pool of both busy and inactive LV candidates and increase the size of the pool of candidates if a focused search does not result in selection of LV candidates to be swapped.

Figure 8:
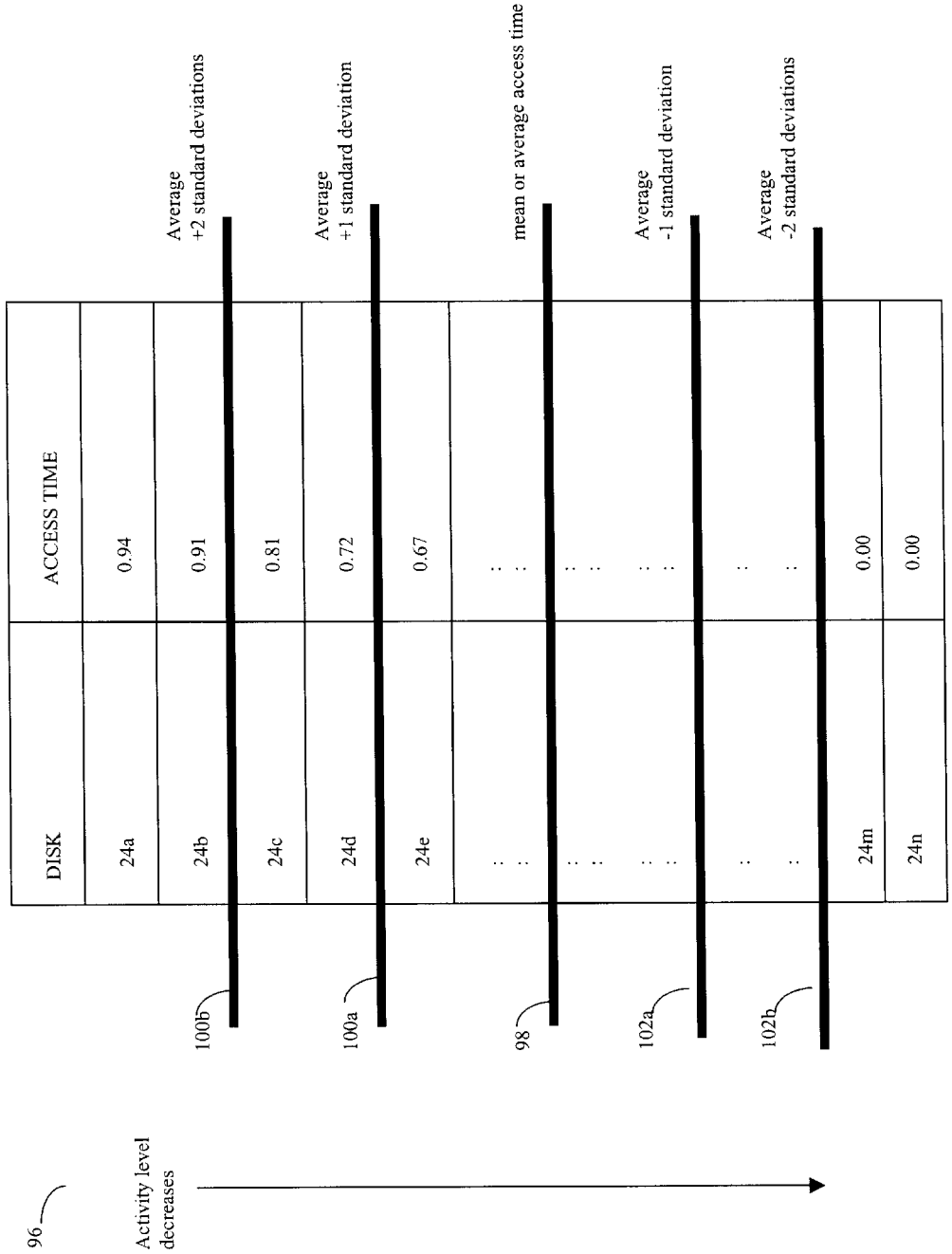
FIG. 8 is an example of a tabular representation of an embodiment of disk access times.

Referring now to FIG. 8, shown is a tabular representation of the access times per disk. In one example, the table 96 includes a representation of access times computed per disk. The mean or average access time may be computed and represented by the line 98. The standard deviation may be computed, as at step 90. The lines 100a and 102a represent respectively, average plus and minus one standard deviation. Similarly, the boundary of average access time plus two standard deviations is represented by line 100b and average access time minus two standard deviations is represented by line 102b. The access times for each of the disks may fall within the different boundaries with respect to the mean or average access time and the number of standard deviations. For example, the access time of disk 24a of 0.94 may correspond to an access time of a disk that falls in the boundary greater than +2 standard deviations of the mean access time.

As will be described in paragraphs that follow with regard to step 94, of the flowchart 84, various pairs of candidate LVs associated with different disks having different access times may be examined. For example, a busy candidate may first be selected from a pool of LV candidates associated with disks having access times greater than average plus two standard deviations. Similarly, an inactive LV candidate may be associated with a disk having an access time which is less than average minus two standard deviations. Each pool of candidates may change on subsequent iterations if this more focused search with a limited number of candidates does not produce a pair of active and inactive LV to be swapped.

What has just been described is a general technique that will be described in more detail in paragraphs that follow. When a focused search does not produce an LV swap pair, the pool of candidates for both inactive and busy LV candidates to be swapped may be expanded. This provides the benefit of an efficient technique using limited resources at first to try and determine a pair of LVs and their associated data to be swapped. Thus, the technique that will be described efficiently uses computing resources to determine an LV pair of candidates which are busy and inactive to be swapped. Additionally, as will also be described, the correlation between LVs may also be considered. Thus, the pairs that may be swapped provide a good predictive indicator that future activity, at least for a predetermined time period, will remain stable. In other words, upon using the computer resources to perform the swap of an active and inactive LV candidate, in accordance with past activities and statistics gathered, future activity may be improved. As described elsewhere herein for example, if an LV pair was deemed to be strongly correlated on one day, it may be at least weakly correlated for a determined time period in the future for approximately, for example, 70% of the data storage devices or Symmetrix™ systems.

Figure 9A:
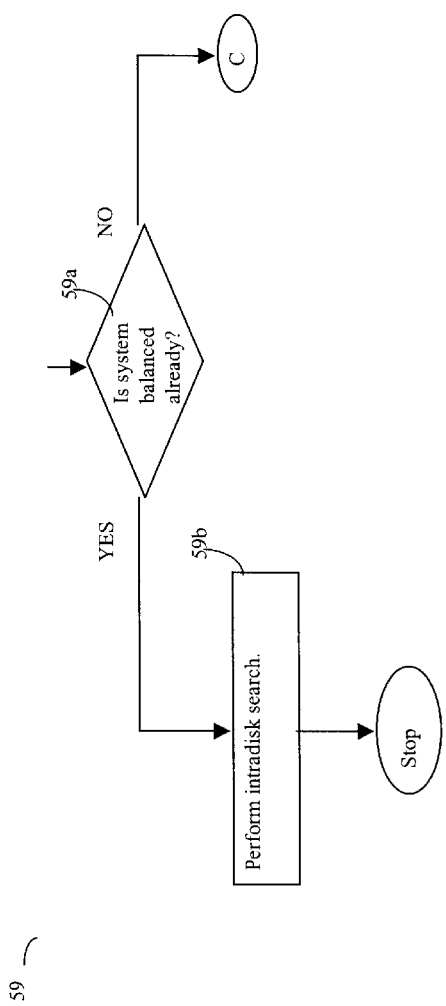
FIG. 9A and FIG. 9B form a flowchart of more detailed method steps of one embodiment for determining a pair of LV candidates.
Figure 9B:
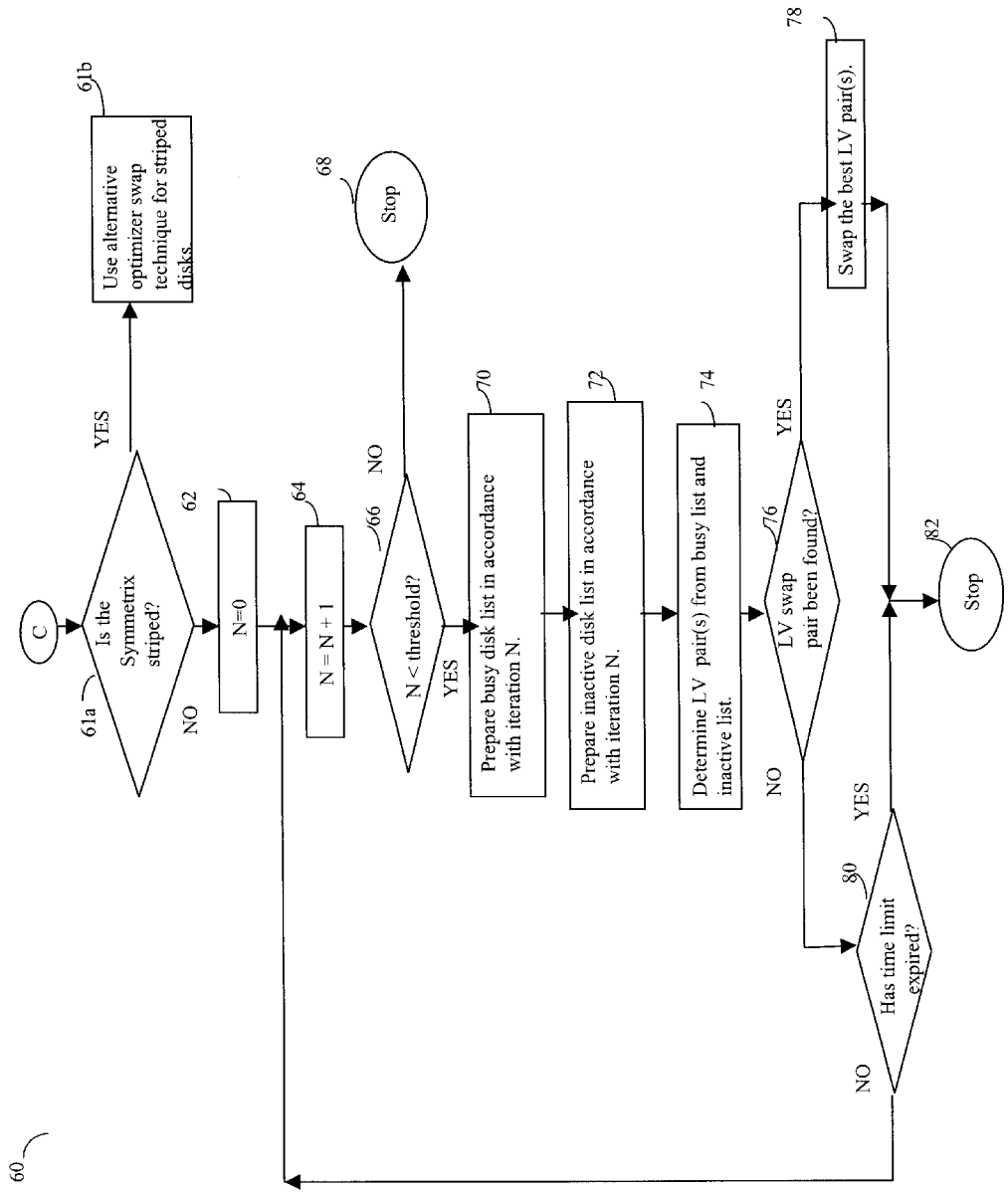

Referring now to FIGS. 9A and 9B, shown is example of an embodiment of a flowchart with more detailed steps for determining LV pairs. At step 59a, a determination is made as to whether the system is currently balanced. A determination as to whether a system is balanced may be made in accordance with criteria and associated thresholds that may vary with embodiment. For example, in one embodiment, a system may be determined as "balanced" if the workload associated with each disk is within a certain level of variation from the mean access time. In one implementation, the criteria is the maximum access time among all disks<twice the minimum access time among all disks in the Symmetrix™ system. The factors may vary in accordance with implementation. In another implementation, the criteria is the skewness of the Symmetrix™ system. For example, the skewness may be 50% which corresponds to 50% of all disks handling 50% of the I/O operations. Other criteria using one or more statistical techniques, as known to those skilled in the art, may also be included in an embodiment.

If a determination is made at step 59a that the system is already balanced, control proceeds to step 59b where an intra disk search is performed for LVs on the same disk. Step 59b seeks to improve the efficiency of each disk by swapping two or more LVs within the same disk. If a determination is made at step 59a that the system is not already balanced, control proceeds to control point C processing steps of FIG. 9B where an interdisk search is performed for LVs located on different disks.

At step 61a, a decision is made as to whether the Symmetrix™ system is striped. In one embodiment, the criterion is whether the number of strongly correlated LV pairs is greater than 10% of all possible distinct LV pairs. Calculations may be made using equations and correlation criteria as described elsewhere herein by determining the correlation level, if any, for every pair of LVs. If a determination is made that the number of strongly correlated LV pairs is more than 10%, it may be concluded that the behavior of the disk activity is that approximating the use of disk striping. As known to those of ordinary skill in the art, disk striping may be described as partitioning a single LV onto different disks. This may be indicated, for example, by having a certain level of highly correlated LV pairs since a single LV partitioned into m portions in m different disks may likely each exhibit similar behavior. It should be noted that other embodiments may have other threshold level and criteria besides that specifically set forth in connection with step 61a to decide which swap determination technique to use. In this instance if there are more than 10% of strongly correlated LV pairs, control proceeds to step 61b where an alternative LV swap technique may be used. In one embodiment, this alternative technique may be as included in another version of the optimizer, for example as set forth in pending U.S. patent application Ser. No. 09/396,253, filed Sep. 15, 1999, entitled "Load Balancing on Disk Array Storage Device", for Bachmat et al., assigned to EMC Corporation, as incorporated by reference herein. An embodiment may also include a variation of this alternative technique, such as a modification to the inactive disk list. For example, in one embodiment, the inactive disk list as may be used in connection with the alternative technique is formed in accordance with a partitioning technique described in connection with the selecting of LV swap pairs, such as in performing processing of step 72 as described elsewhere herein in more detail.

It should also be noted that an implementation may include other criteria and other threshold levels, such as other than 10%, for concluding whether there is disk striping associated with the storage devices for which the current load balancing is being performed.

If a determination is made at step 61a that the Symmetrix™ system is striped, control proceeds to step 62. At step 62, the loop control variable, N, is initialized to be zero. At step 64, the loop control variable is incremented by one, at step 66, a test is performed to determine whether N is less than some predetermined threshold. In this example, as will be described in paragraphs that follow, the threshold is 11. In other words, this processing steps of the loop beginning at step 64 may be performed up to 10 times in accordance with different combinations of candidates for busy and inactive LVs.

At step 66, if a determination is made that N is not less than a threshold value, control proceeds to step 68 where the method stops. At step 66, if a determination is made that N is less than the threshold value, control proceeds to step 70 where a busy disk list is prepared in accordance with the iteration value of N. As will be described in more paragraphs that follow in connection with other figures, the pool of candidates from which a busy LV candidate may be chosen is the "busy disk list". In other words, the "busy disk list" represents the pool of candidates, from which a busy LV may be determined as one of the LVs in the pair to be swapped. The pool of candidates, or the actual disks, and their LVs included in the busy disk list may vary with each iteration as represented by N.

Control proceeds to step 72, where similarly, in an "inactive disk list" maybe prepared in accordance with the value of the iteration N. Control proceeds to step 74, where a LV pair from the busy disk list and the inactive disk list is determined if possible. It should be noted that at times step 74 may not produce an LV pair representing a pair of candidates to be swapped. At step 74, the LV pair represents a pair of LVs in which one LV is from a disk with a high access time and is to be swapped with an LV that has been determined to reside on a low or an inactive disk.

At step 76, a determination is made as to whether the LV swap pair has been found. If a determination is made at step 76 that a pair of LV candidates has not been found, control proceeds to step 80 where a determination is made as to whether a time limit has expired. If so, control proceeds to step 82 where the flowchart method steps of FIG. 9B stop. However, if a time limit, such as a predetermined amount of computing time for this method to execute, has not expired or been exceeded, control proceeds from step 80 to the top of the loop formed at step 64 where the next loop iteration continues to increment the value of N.

At step 76, if a determination is made that the best LV swap pair has been found, control proceeds to step 78, the LV swap is actually performed. It should be noted that what is "best" in terms of an LV swap pair and the actual number of pairs swapped may vary in accordance with each embodiment. For example, "best" LV swap pair may be chosen to be the LV swap pair that will produce the greatest decrease in access times of the disks. In another embodiment, the "best" swap pair is chosen to be the pair that will lower most the maximum of the new access times of the disks. In yet another embodiment, other criteria may be used. It should also be noted that a variety of different techniques may be known to those skilled in the art to actually perform the data swap between the two LVs as identified in the pair at step 74. An example of one embodiment of exchanging or swapping the data of two LVs is set forth in U.S. patent application Ser. No. 09/396,218, filed Sep. 15, 1999, entitled "Method for Transparent Exchange of Logical Volume in the Disk", and is herein incorporated by reference. Following the actual data swap of the data included in each of the LVs at step 78, control proceeds to step 82 where the method stops at step 82.

It should generally be noted that the foregoing results in a single LV pair being determined and swapped having data included therein being swapped. However, an embodiment may determine more than one pair and may swap data associated with more than one LV pair in accordance with the desired increase in performance, for example, in an implementation. Also as described herein, whether a particular disk is busy or inactive is determined in accordance with access time as also described herein. It should be noted that other statistics may be used in determining whether a particular disk is busy or inactive. As will also be described, whether a disk is busy or inactive may be determined with regard to disk activity using thresholds and formulas described herein. Disk activity may be determined in accordance with varying thresholds as well as other measurements taken with respect to disk I/O activity or performance.

At step 80, a time limit may be associated with a particular execution of this flowchart performed in the optimizer. This may be, for example, such that the optimizer has a maximum time limit in terms of computer resources or processor execution time which may be associated at any one particular time in performing and determining an LV pair. The actual time limit, if any, may vary with each embodiment, such as in accordance with computer resources. For example, one embodiment may raise a time limit in accordance with determining system activity or resource usage. Similarly, a time limit in determining a LV pair may be decreased in accordance with an increase demand for computer resources, such as processor time, in connection with other system activities. This may vary in accordance with each embodiment.

The threshold value associated with N which is the number of iterations of the method steps of the flowchart in this particular example embodiment is 10. This limit maybe determined in accordance with the different combinations or groupings associated with standard deviation boundaries as well as a default technique for choosing a candidate. A particular embodiment may vary the number of iterations, such as the value of N, and the threshold in accordance with the desired number of iterations the optimizer is to perform. For example, one embodiment may only wish to consider a focused search and only those candidates within the mean plus or minus two standard deviations before switching over to another alternative technique. The pool of candidates examining each particular may vary, for example, in accordance with activities or details or each particular embodiment.

Figure 10:
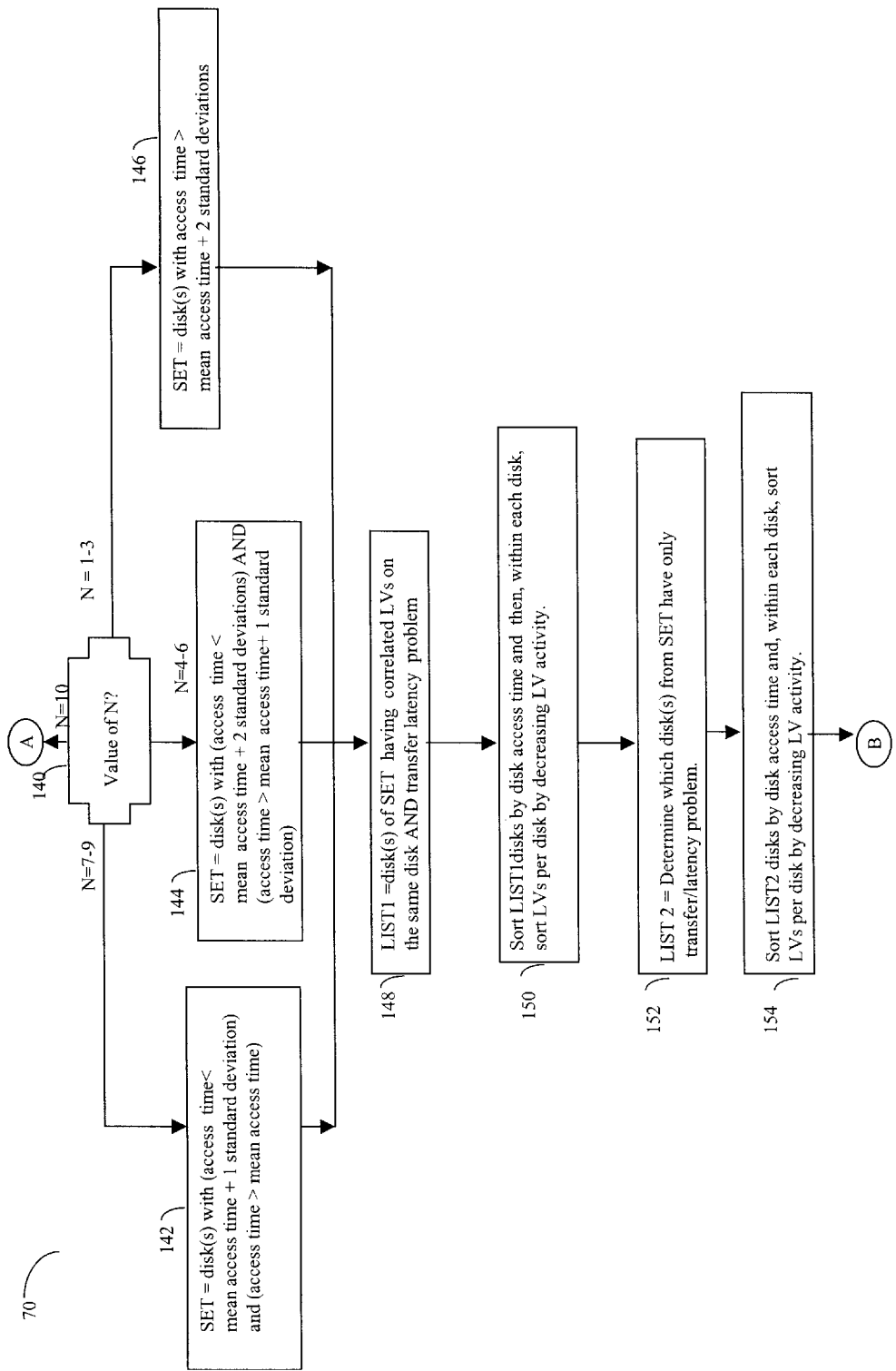
FIGS. 10–12 form a flowchart of more detailed steps of one embodiment for forming a busy or active disk list.
Figure 11:
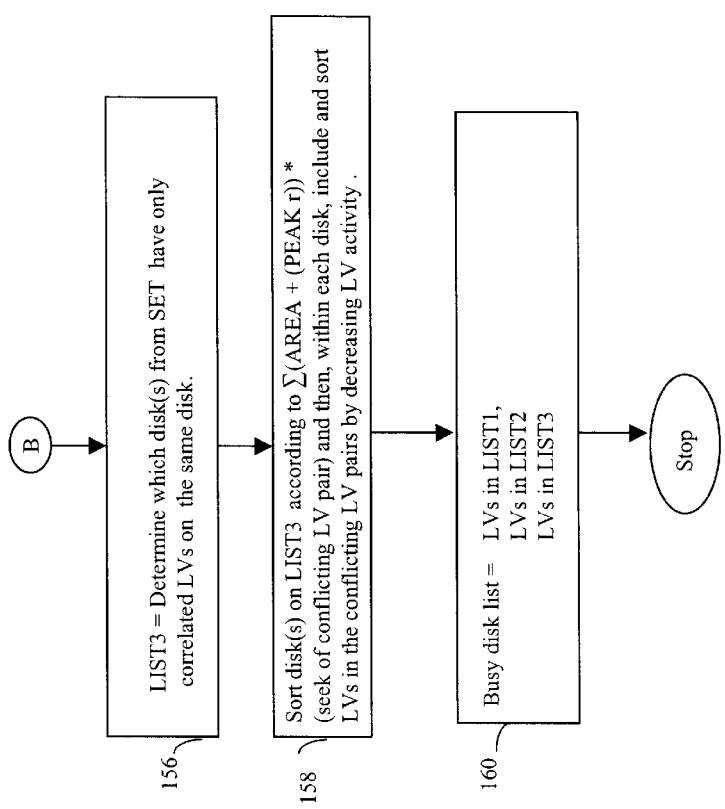
Figure 12:
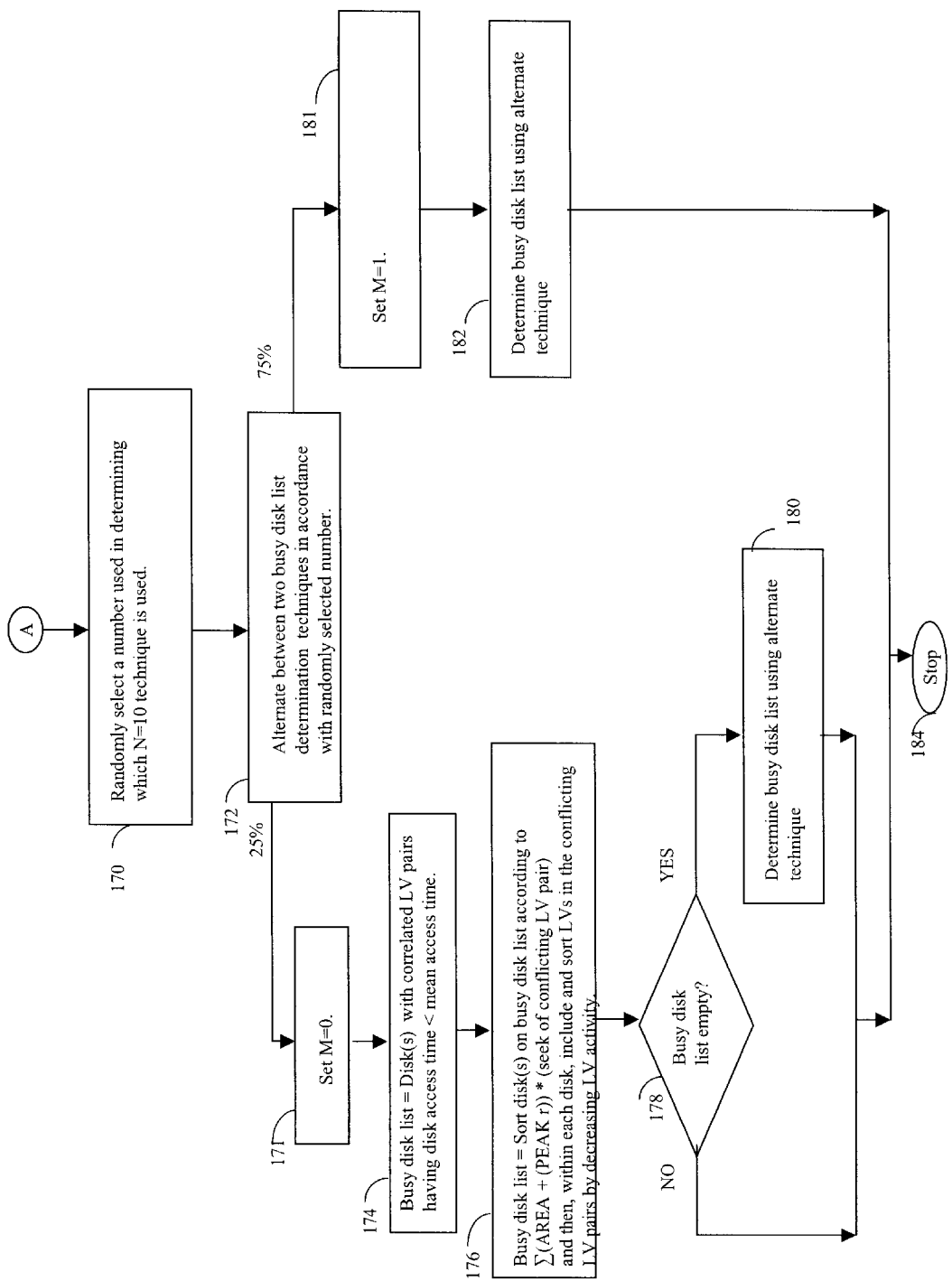

Referring now to FIGS. 10–12, shown is a flowchart of the method steps for one embodiment of forming the busy disk list. The processing steps included in flowchart of FIGS. 10–12 show more detailed processing steps of the previously described step 70. At step 140, a four-way decision is made in accordance with the value of N representing the number of iterations of the main loop. If N is in the inclusive range of values 1 through 3, control proceeds to step 146 where disks having an access time greater than the mean access time plus two standard deviations are determined. If the value of N is within the range of 4 to 6 inclusively, the disks having an access time less than the mean access time plus two standard deviations, and also having an access time which is greater than the mean access time plus one standard deviation are determined at step 144. If the value of N is determined between the range of 7 through 9 inclusively, control proceeds to step 142 where disks having an access time less than the mean access time plus one standard deviation and also having an access time which is greater than the mean access time are determined. If N has the value of 10, control proceeds to the point A.

Generally, what is being determined at steps 142, 144, and 146 for particular values of N in the range 1 through 9 inclusively, are varying pools of candidates from which a busy LV candidate may be determined. It should be noted that for values of N in the inclusive range 1–3, representing earlier execution steps, the pool of candidates may be determined from the busiest candidate in accordance with access times. Similarly, for the next set of iterations when N=3–6 inclusively, the next ranked busiest disks are determined as a pool of candidates. Finally, for N having values in the inclusive range of 7 through 9, if no candidate or swap pair has been found yet, those disks which may be deemed as less busy in comparison with earlier pools of candidates are also included in the current pool of candidates. For a value of N equal to 10, the control proceeds to point A where an alternative technique is applied if 9 other iterations of progressively looking at different pools of candidates has failed to produce an LV swap pair using the technique described herein so far.

Subsequent to the processing of steps 142, 144, and 146, control proceeds to a common point at step 148. What will be described in the next few steps associated with flowchart 70 is the formation of three separate lists in accordance with different criteria for disk activity and characteristics. At step 148, List 1 is determined to be those disks having correlated LVs on the same disk and a transfer/latency problem. As used in connection with step 148 and other processing steps, for example, such as step 152, reference made to the transfer/latency problem may be identified for disks for which the following condition holds true:

if((disk transfer time−minimum possible disk transfer time)>disk seek time) OR
(disk latency>disk seek time)

In other embodiments, different formula may be used as a criterion for identifying the transfer/latency problem.

It should be noted that an embodiment may determine components of the foregoing using any one of a variety of techniques. For example, one embodiment may determine "disk transfer time" using equation 5 of the pending U.S. patent application Ser. No. 09/396,253. This equation may be used, for example, when the LV covers more than one "zone". The disk seek time, as described elsewhere herein, may be determined using equation 6 of the pending U.S. patent application Ser. No. 09/396,253. An embodiment may use equation 6 rather than equation 7 as equation 6 may be more accurate. An embodiment may also approximate Tij, as also described elsewhere herein, for example, as a technique to speed up calculations.

The minimum possible disk transfer time may be determined as follows. Given a disk and the logical volumes residing therein, a theoretical new disk may be formed. The LVs may be reordered on the disk by placing the most active or busiest on the outer part of the disk and then the next busiest LV, and so on, under the restriction that the size/capacity of the LV is the same as the size/capacity of the LV that was there before. Subsequently, the transfer time of the reordered disk is computed. This is the minimum disk transfer time. For example, the activity level in one embodiment may be determined in accordance with the activity of equation 2 included herein. The following reorders the LVs using the foregoing technique. This is an example before reordering:

|  | LV# | capacity | activity |
|---|---|---|---|
| outer part of disk | 1 | 9 gigabytes (GB) | 201 |
|  | 2 | 4 GB | 400 |
|  | 3 | 9 GB | 50 |
| inner part of disk | 4 | 4 GB | 1400 |

After reordering, there is the following:

| LV# | capacity | activity |
|---|---|---|
| 1 | 9 gigabytes (GB) | 201 |
| 4 | 4 GB | 1400 |
| 3 | 9 GB | 50 |
| 2 | 4 GB | 400 |

It should be noted that two LVs may be categorized as correlated, for example as in step 148 processing, in accordance with different correlation levels. For example, one embodiment may determine that two LVs are correlated if they meet the criteria and levels associated with the STRONGLY correlated criteria described elsewhere herein. Similarly, another embodiment may use the MEDIUM STRONGLY correlated criteria, the WEAKLY correlated criteria, or some combination of these 3 criteria, or other criteria for determining whether two LVs have correlated activity levels.

It should also be noted that if a disk includes two LVs which are determined to be correlated, then that disk may be referred to as having a correlated LV pair problem or a conflicting LV pair.

At step 150 the List 1 disks are sorted by access time and then within each disk sort the LVs per disk by the LV activity, for example, as may be determined in accordance with the LV activity formula described elsewhere herein. Other embodiments may determine and rank LVs per disk in accordance with other data and statistics associated with LV performance and activity. At step 152, the second list, List 2, is determined as being those disks having only the transfer/latency problem. At step 154, the List 2 disks if any are sorted by access time and then within each disk sorting of the LVs occurs per disk in accordance with LV activity. Following step 154, control proceeds to point B, FIG. 11 to step 156.

At step 156, a third list, List 3 is determined in which the disks having only the correlated LVs on the same disk are determined. At step 158, the List 3 disks are sorted in accordance with yet a different criterion using formulas previously described herein. This criterion can be implemented using a variety of formulae. In particular, in one implementation, those disks on List 3 are sorted in accordance with:

$$\sum_{i=1}^{n}((AREA_i + PEAK_{ri}) * SEEK_i)$$ (Equation 4a)

in which the foregoing is summed for all correlated LV pairs on each disk. The disks are ranked in accordance with this statistic in decreasing order. It should be noted that, for example, the AREA, PEAKr and other statistics used in this processing step are described in more detail elsewhere. As also described in more detail elsewhere herein, the conflicting LV pair is an LV pair that has been determined to have correlated activity and in which both LVs are on the same disk.

In one embodiment, it should be noted that the result of each of these lists include a set union of logical volumes or LVs. In the formation of List 1 and List 2, all the LVs which occur on a disk appear in the final lists. However, in contrast, in the formation of List 3, only those LVs which occur in the conflicting LV pair from a particular list actually are included in List 3. In other words, in List 3, a disk may be identified by having 2 LVs included, for example, out of a possible 10 LVs on the entire disk. However, in the final version of List 3 as formed by step 158, only those two LVs that are actually in connection with a correlated pair appear on the list. For each disk, the LVs on each disk are sorted further in accordance with LV activity. At step 160, the busy disk list is formed as a concatenation of List1, List2 and List 3 in that order.

In one embodiment, the particular order in which busy LV candidates are examined may be of significance if there is a processing time limit associated with determining an LV swap pair. For example, in one embodiment, rather than terminate the search for a swap pair at the first determination of a pair, the entire pool of candidates may be examined and the best LV pair may be selected from one or more pairs in accordance with the best predicted improvement. A time limit may expire prior to examining all combinations of possible candidates, and the ones appearing toward the end of the list may not be examined. If the time limit expires prior to examining all possible combinations of candidates, the best LV pair may be selected from those LV pairs thus far.

Referring now to FIG. 12, shown is an example of the embodiment of the flowchart of method steps for forming a busy disk list of LVs when N=10 in the main loop in connection with the flowchart of FIGS. 9A and 9B. Previously described in connection with the FIGS. 10–11, more detailed processing steps were described in connection with flowchart 70 values of N=1 through 9, inclusively. What will now be described are more detailed processing steps associated with the processing of step 70 when N=10. In connection with FIG. 12, control is transferred to point A when the value of N is determined to be 10 at the multi-decision in accordance with the value of N at step 140 of FIG. 10.

The general processing technique described in connection with FIG. 12 may be performed in one embodiment when a pair of LV candidates for swapping a busy, active LV with a lower activity LV has not been determined in earlier iterations (e.g., N<10). At step 170, a number may be randomly selected. At step 172, a determination is made in accordance with a randomly selected number that a first technique may be used twenty-five percent (25%) of the time and a second technique may be used seventy-five percent (75%) of the time. The use of random number generation in accordance with selection between alternate paths for predetermined percentages are known to those skilled in the art. It should be noted that a different percentage may be associated with each of the different alternate paths selected at step 172. It should also be noted that more than two techniques may be used in the selection process.

Additionally, N may have a value other than 10 in other embodiments when selecting one of a plurality of different techniques to be used in producing a busy or active disk list.

At step 172, a determination is made 25% of the time to use a first technique in which control proceeds to step 171 where a variable M is assigned the value 0. It should be noted that this variable M in this embodiment may be used in subsequent processing steps as are described in more detail in following paragraphs. Control proceeds to step 174. At step 174, disks associated with the busy disk list are determined to be those disk(s) having correlated LV pairs with a disk access time less than the mean access time. For each disk having one of more correlated LV pairs, such as n pairs, at step 176, determine the statistic as given by Equation 4A.

The disks are ranked in accordance with this statistic in decreasing order. Additionally, a second tier sorting or ranking occurs within disks selected having more than one correlated LV pair. Within each disk, only the LVs from the correlated LV pairs are included and further sorted by decreasing level of LV activity.

At step 178, a determination is made as to whether the busy disk list produced at step 176 is empty. If a determination is made that the busy disk list is empty, control proceeds to step 180 where an alternate technique may be used to determine LVs of the busy disk list before proceeding to step 184. If a determination is made at step 178 that the busy disk list is not empty, control proceeds directly to step 184 at which the processing associated with flowpoint A is terminated.

At step 172, seventy-five percent (75%) of the time the busy disk list may be determined using an alternate technique in accordance with a randomly selected number. At this point, control proceeds to step 181 where the variable M is assigned the value 1. Control proceeds to step 182. It should be noted that in this particular example, the processing technique used in steps 180 and 182 may be the same or different techniques. Additionally, the exact technique implemented at either or both of steps 180 and 182 may vary in accordance with each particular embodiment. In one particular embodiment, for example, the alternate technique implemented at steps 180 and 182 may be that as included in a prior version of an optimizer. For example, in one embodiment, the alternate technique may specify that the busy disk list implemented seventy-five percent (75%) of the time may be all those LVs on all of the disks sorted by decreasing disk access time.

In connection with performing processing of steps 180 and 182 of an alternate technique, one embodiment uses a single disk from the busy disk list and each element of the free disk list to determine a best LV swap pair. There may be more than one free disk list, for example, as described elsewhere herein in which there are three free disk lists each including disks in accordance with varying criteria and characteristics. If one or more LV swap pairs are found, one or more LV swaps may occur in accordance with predetermined criteria for each LV pair. If no LV swap pair is found, however, a comparison may be performed using another free disk list. If all the free disk lists have been checked and no LV swap pair has been determined, the next disk from the busy disk list may be used with the first free disk list, and so on. In other words, each disk of the busy disk list may be examined in connection with each of the free disk list(s). When that fails to produce an LV pair, the next disk on the busy disk list is examined in connection with each of the free disk list(s). For N=10, in this example, the pool of candidates has been changed since the more focused searches of prior iterations, such as for N=1–9, has not produced a swappable LV pair.

It should also be noted in the foregoing description, that in addition to associating a time limit with the overall technique performance time, a soft time or expiration time limit may be associated with each round or iteration of N. In other words a particular iteration may terminate with a given time limit. This round time limit may be used separately, or in combination with, an overall time limit. The ordering of the lists and the ordering of the disks within each list, as described elsewhere herein, thus guarantees that the most problematic disks are examined before the various time limits are reached.

Figure 13:
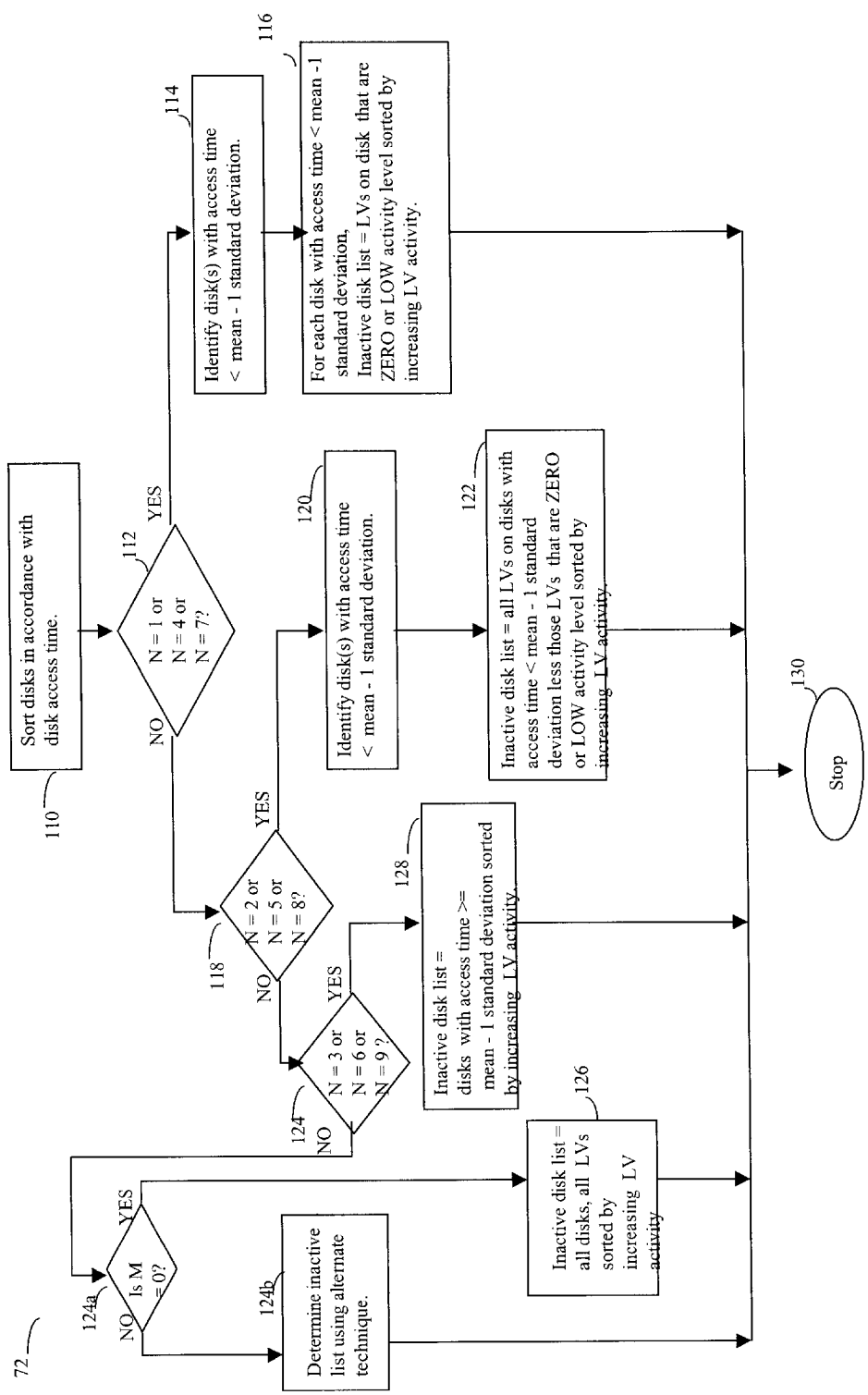
FIG. 13 is a flowchart of more detailed steps of one embodiment for forming a free or inactive disk list.

Referring now to FIG. 13, shown is a flowchart of method steps of an embodiment for preparing the free disk list or inactive disk list. The steps shown in the flowchart 72 of FIG. 13 are more detailed processing steps of step 72 previously described in connection with the method of FIGS. 9A and 9B. At step 110, all of the disks are sorted in accordance with disk access time. Control proceeds to step 112 where a decision is made as to whether N, representing the number of iterations, has the value of 1, 4 or 7. If it is determined that N has a value of 1, 4 or 7, control proceeds to step 114 where those disks with an access time less than the mean access time minus one standard deviation are determined. Control then proceeds to step 116 where, for each disk with the access time less than the mean access time minus one standard deviation, the inactive disk list is assigned to be the list of all the LVs on the disk that are of ZERO or LOW activity level. Subsequently, control proceeds to step 130 where the inactive disk list has been prepared to include those LVs for the iteration value of N equal to 1, 4 or 7.

At step 112, if a determination is made that N is not 1, 4 or 7, control proceeds to step 118 where another decision is made as to whether N has the value of 2, 5 or 8. If N has the value of 2, 5 or 8, control proceed to step 120 where the disks having an access time less than mean minus one standard deviation are identified. Subsequently, control proceeds to step 122 where the inactive disk list is assigned to be the list of all those LVs on the disk having an access time less than the mean access time minus one standard deviation, less those LVs that are of ZERO or LOW activity level. In other words, at step 122, the inactive disk list for iterations equal to 2, 5 or 8 are assigned to be those LVs on disks with an access time less than mean minus one standard deviation less those LVs that were previously examined for a value of N equal to 1, 4 or 7. Subsequently, control proceeds to step 130 where the inactive disk list is returned.

At step 118, if a determination is made that N does not equal 2, 5 or 8, control proceeds to step 124 where a decision is made as to whether N equals the value of 3, 6 or 9. If N has the value of 3, 6 or 9, control proceeds to step 128 where the inactive disk list is assigned to be the list of all those LVs on disks having an access time greater than or equal to the mean access time minus one standard deviation and smaller than the mean access time. In other words, at step 128, the inactive disk list is assigned to be the list of LVs which are the complement of those previously examined when N equaled the value of 1, 4, or 7 or 2, 5 or 8. Subsequently, control proceeds to step 130 where the inactive disk list is returned.

At step 124, if a decision is made that N is not equal to 3, 6 or 9, control proceeds to step 24*a* where a determination is made as to whether M is 0. If M=0, control proceeds to step 126 where the inactive disk list is assigned to be the list of LVs included on all of the disks. Subsequently, control proceeds to step 130 where the inactive disk list is returned. If a determination is made that M does not equal 0, control proceeds to step 124*b* where the inactive disk list may be determined using an alternate technique that may vary in accordance with each embodiment. An example of an alternate technique that may be included in an embodiment is described in more detail elsewhere herein. Control proceeds to step 130.

It should be noted that for different values of N representing the iteration of the main loop, the inactive disk list is varied. In particular, for certain values of N such as on iterations of N equal to 1, 4 or 7, a more focused search using a smaller number of LV candidates may be used. The pool of LV candidates may vary on other iterations, such as N=2, 5 or 8, to include the complement of those LVs examined on iterations when N equaled 1, 4 or 7. Further, when N has the value of 3, 6 or 9, the inactive disk list may be expanded to include those LVs assigned on disks complementary to those previously examined for the values N equal to 1, 2, 4, 5, 7 or 8. Upon the value of N being 10, which is the last iteration, the inactive disk list may be assigned to be all of the LVs included in the system. In other words, upon not finding a pair of LVs to be swapped on a round with an iteration of N equal to 1 through 9, at the iteration of N equal to 10, the entire population of LVs may be used to determine a possible swap candidate.

Figure 14:
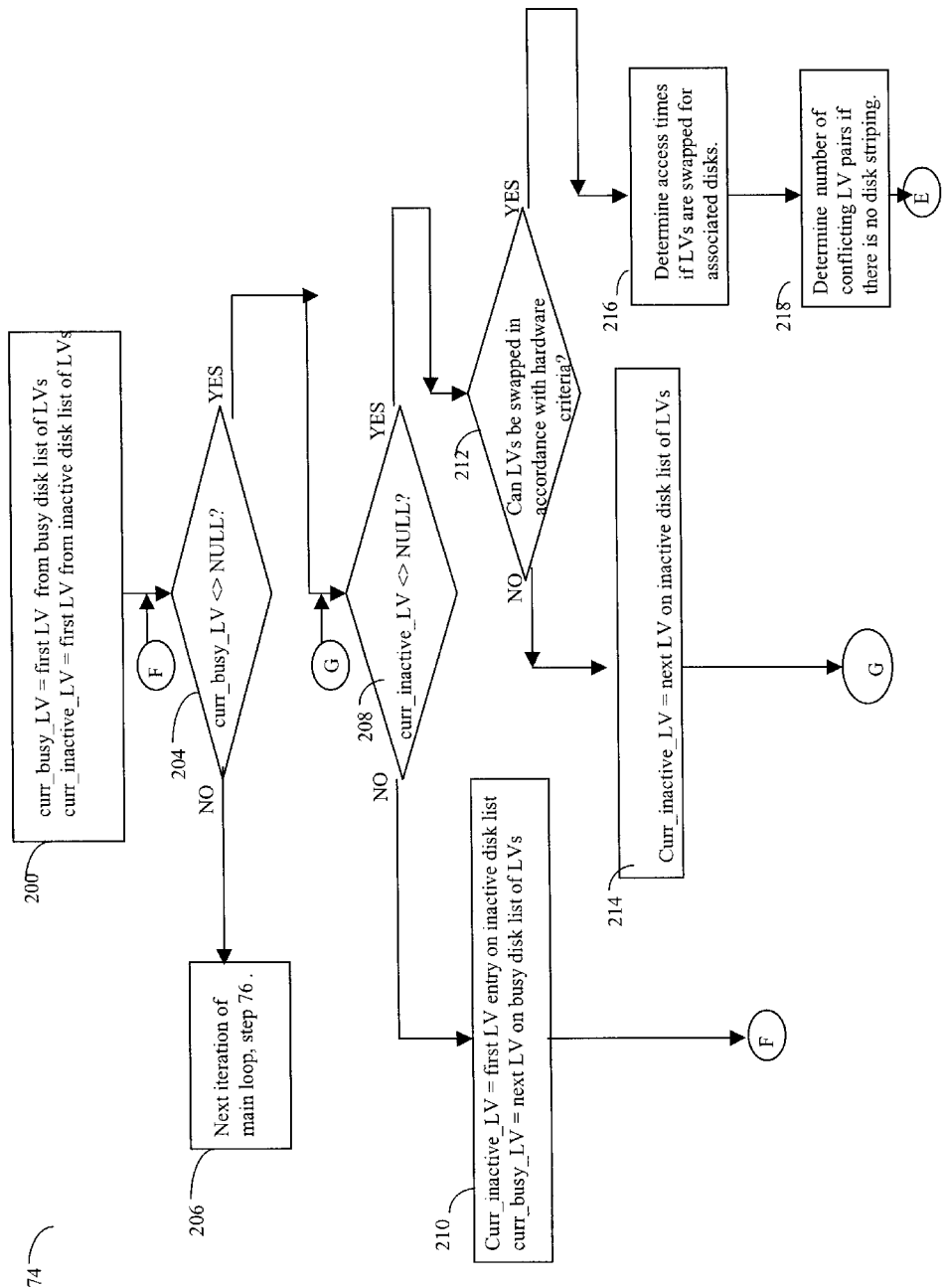
FIGS. 14 and 15 form a flowchart of more detailed steps of one embodiment for determining if an LV pair may be swapped in accordance with predetermined criteria.
Figure 15:
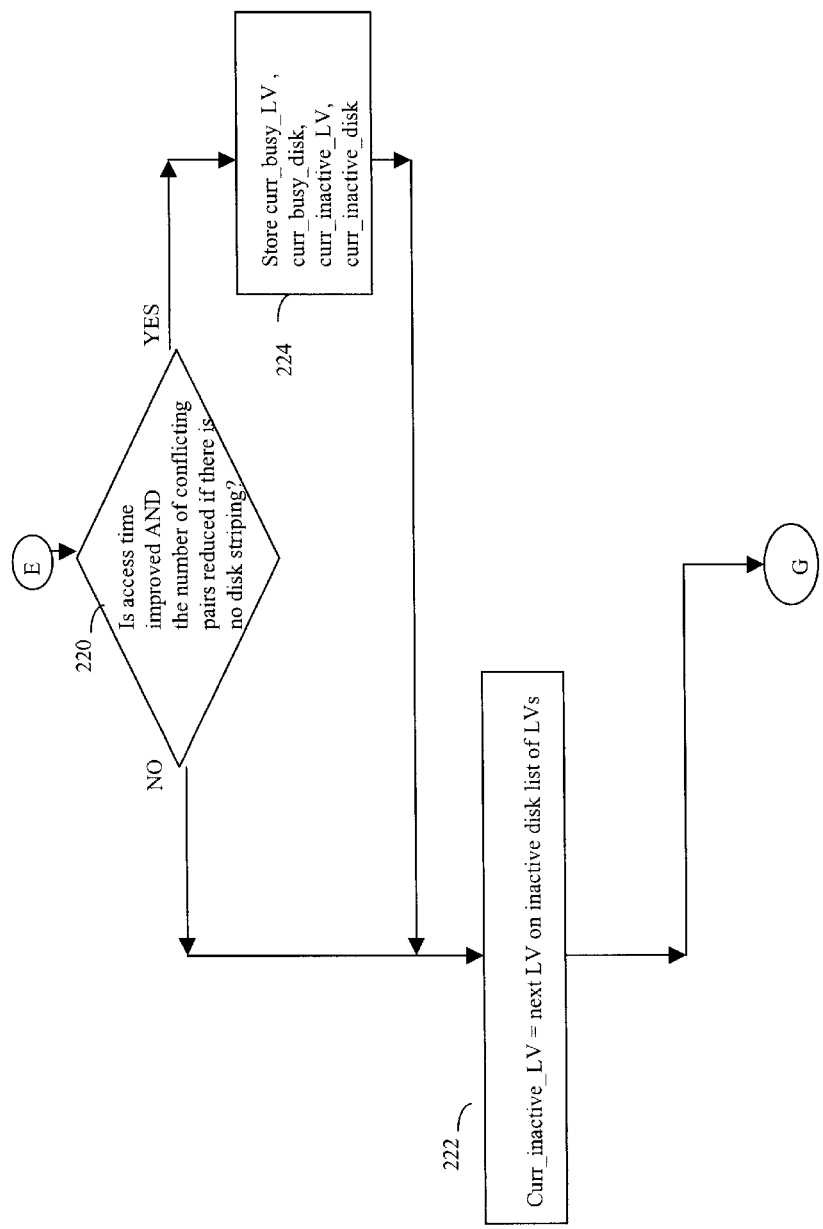

Referring now to FIGS. 14 and 15, shown are more detailed processing steps of step 74 previously described in connection with steps of FIG. 9B. In other words what will be described in more detail are processing steps of one embodiment for determining the LV candidate pair in accordance with particular criteria that may vary in accordance with each particular embodiment.

At step 200, variable initialization is performed. Curr_busy_LV is assigned the first LV from the busy disk list of LVs. Curr_inactive_LV is assigned the first LV from the inactive disk list of LVs. It should be noted as previously described, each of the busy disk list and the inactive disk list includes LVs of each of the disks in accordance with certain criteria. Each of the disks are ranked in accordance with one set of criteria and each of the LVs within each of the disks, appearing on the disks were also ranked. Thus, as will be described in paragraphs that following assumed that each of the busy disk lists and the inactive disk list is a list of LVs. It should be noted that the embodiment of processing steps described in connection with FIGS. 14 and 15 search for all swappable LV pairs in every iteration of flowchart 60. In step 76 of FIG. 9B as described elsewhere herein, it is determined if there are any swappable LV pairs. If so, then the best pair or pairs of LVs are determined in accordance with predetermined criteria. Other embodiments may rather go through these iterations in accordance with a predetermined time limit and select, within that time limit, the "best" pair of LV candidates in accordance with predetermined criteria.

Control proceeds to step 204 where a decision is made as to whether the curr_busy_LV is not equal to NULL. If a determination is made that the curr_busy_LV does not equal NULL, control proceeds to step 208 where a determination is made as to whether curr_inactive_LV does not equal NULL. If a determination is made that curr_inactive_LV does not equal NULL, control proceeds to step 212 where yet another determination is made as to whether the LVs as indicated by curr_inactive_LV and curr_busy LV may be swapped in accordance with hardware criteria. It should be noted that the hardware criteria may vary with each particular embodiment. In one embodiment, for example, this criteria may include the size of each LV, which bus the LVs are located on for communication purposes, the type of emulation and/or microcode, and the like.

If a determination is made that the LVs may be swapped in accordance with hardware criteria specified, control proceeds to step 216 where the access times are determined in a predictive fashion if the LVs are swapped for the associated disks. In other words, a "what if" scenario evaluation is made at step 216 where the access times for the disks associated with each of the LV pair are determined using data for each LV gathered in accordance with past activity. Hypothetical disk calculations are made, such as disk access times recalculated, with the assumption that the previous LV activity may be associated with another, different disk if the LV swap is made. For example, if LVa is on disk A and LVb is on disk B and LVa and LVb are the swap pair, disk access time for disks A and B are calculated associating the LVa activity with disk B, and the LVb activity with disk A.

At step 218, the number of conflicting LV pairs is determined for the LV pair if there is no disk striping. In other words, step 218 may be conditionally performed in that the number of conflicting LV pairs is determined only if there is no disk striping in this particular embodiment. Control proceeds to point E at step 220 where a determination is made as to whether the access time for the disks are improved and, additionally if there is no disk striping, is the number of conflicting pairs reduced or remains the same, by the hypothetical swap. If this condition at step 220 is evaluated to Yes or True, control proceeds to step 224 where the curr_busy_LV and its associated disk as well as the inactive_LV and its associated disk may be stored. Control proceeds to step 222. At step 222, the next inactive_LV is assigned to the variable curr_inactive_LV. Control proceeds to flow point G at step 208.

At step 220, if the condition evaluates to No or False and the access time is not improved or the number of conflicting pairs is increased when there is no disk striping, control proceeds to step 222. At step 222, the next inactive LV is assigned to the variable curr_inactive_LV to be examined next. Control proceeds to flow point G at step 208. In other words, if a determination is made at step 220 that access times are improved and the number of conflicting pairs is reduced or remains unchanged in accordance with the hypothetical determination of performing the LV swap, the LV pair is determined to be the current element LV of the inactive list of LVs, and the current element LV of the busy list of LVs. Otherwise, the next inactive LV is examined and control returns to flow point G at step 208.

If, at step 212, a determination is made that the LVs may not be swapped in accordance with hardware criteria, control proceeds to step 214 where the next LV on the inactive disk list is examined. Control also proceeds to flow point G at step 208.

At step 208, if a determination is made that the condition specified evaluates to no or false, that is, the curr_inactive_LV is NULL, implying that processing with one iteration of the inactive disk list for a given busy disk LV is complete, control proceeds to step 210. At step 210, curr_inactive_LV is assigned to the beginning of the inactive disk list of LVs. Curr_busy_LV is assigned to the next LV on the busy disk list of LVs to examine the next busy LV in accordance with a combination of each inactive LV on the inactive disk list of LVs.

At this point, control proceeds to flow point F at step 204 where a determination is made as to whether the curr_busy_LV is equal to NULL. In other words, step 204 determines whether processing is complete by comparing every busy LV with every inactive LV combination. Upon the occurrence of examining every combination of busy and inactive LV pairs, control proceeds to step 206 where control proceeds to step 76. Information regarding any swap pairs found is transferred to step 76.

What has just been described is a technique for determining an LV swap pair in which the pool of possible candidates may vary with iteration. The earlier iterations may perform a more focused search with a more limited set of candidates thereby looking at a more limited number of busy and inactive candidate LV pairs. If using this focused technique does not produce an LV swap pair, the pool of candidates may be expanded in later iterations. Thus, the more focused search may use computer resources more wisely and efficiently by limiting the number of candidates or pairs first examined by first examining only the best pairs of LV candidates, such as the busiest and the most inactive candidates.

By initially focusing on a narrow pool of candidates, the swap pair may be found more efficiently. Additionally, there may be a greater likelihood that the problem detected and corrected today will be a continued improvement due to the criteria used in accordance with statistical observations in connection with stability of storage devices as explained elsewhere herein.

The foregoing techniques that may be included in an embodiment and used to improve performance of a data storage system, such as the Symmetrix™ system, may also be used to improve the performance of other logical entities. For example, the foregoing description sets forth correlation techniques to describe the behavior of data storage systems for a particular time period. These same correlation techniques may be used in connection with improving the performance of other entities having performance behavior that may be described in terms of correlation metrics, for example, as described in more detail elsewhere herein. The foregoing correlation techniques may be applied to time periods or intervals deemed to be of varying length, for example, longer time intervals as with the optimizer for data gathering, or short time periods of data gathering.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method executed in a computer system for determining a pair of exchangeable logical volumes comprising:
   determining a first logical volume as an active logical volume by incrementally examining various portions of a list of logical volumes sorted in accordance with performance data;
   determining a second logical volume as an inactive logical volume by incrementally examining various portions of a list of logical volumes sorted in accordance with performance data; and
   exchanging said first and said second logical volumes.

2. The method of claim 1, further comprising:
   determining, in accordance with previously gathered performance data, if said exchange of said first and second volumes will increase performance of disk devices associated with said first and second logical volumes;
   wherein said exchanging said first and said second logical volumes is performed if it is determined that said exchange will increase performance.

3. The method of claim 2, wherein said performance data includes at least one of disk access time, transfer time, latency time, seek time, correlation factors, and activity levels.

4. The method of claim 3 further comprising:
   decreasing at least one of: access time for at least one disk and the number of conflicting pairs of logical volumes in said computer system and increasing performance of said computer system in accordance with predetermined performance criteria.

5. The method of claim 1 further comprising:
   comparing a first set of active logical volume candidates with a second set of inactive logical volume candidates, said first set and said second set being determined in accordance with predetermined statistical information.

6. The method of claim 5, wherein determining a first logical volume as an active logical volume further comprises:
   updating said second set of inactive logical volume candidates forming an updated second set for a predetermined number of times, said updated second set being determined in accordance with revised statistical information to add one or more logical volumes to said second set by extending thresholds of performance data; and
   for each of said predetermined number of times, comparing said updated second set with said first set of active logical volume candidates.

7. The method of claim 6, further comprising:
performing said updating of said second set and said comparing said updated second set with said first set until a predetermined number of pairs of exchangeable logical volumes are determined.

8. The method of claim 7, wherein determining a first logical volume as an active logical volume further comprises:
updating said first set of inactive logical volume candidates forming an updated first set for a predetermined number of times, said updated first set being determined in accordance with revised statistical information by extending thresholds of performance data; and
for each of said predetermined number of times, comparing said updated first set with said second set of inactive logical volume candidates.

9. The method of claim 8, further comprising:
performing said updating of said first set and said comparing said updated first set with said second set until a predetermined number of pairs of exchangeable logical volumes are determined.

10. The method of claim 8, further comprising:
partitioning at least one of said first set of active volume candidates and said second set of inactive volume candidates into a predetermined number of lists, each of said lists including logical volumes of disks being determined in accordance with different statistical parameters.

11. The method of claim 10, wherein determining a first logical volume as an active logical volume further comprises:
forming a first list including logical volumes from one of said first and said updated first sets, said first list including logical volumes having a pair of correlated logical volumes on a same disk and each of said disks having a transfer-latency condition.

12. The method of claim 11, wherein said transfer-latency condition is used in determining an under-performing disk, and said transfer latency condition being represented as:
((actual disk transfer time—minimum possible disk transfer time)>disk seek time) OR (disk latency>disk seek time).

13. The method of claim 12, wherein determining a first logical volume as an active logical volume further comprises:
forming a second list including logical volumes from one of said first set and said updated first sets, said second list including logical volumes from disks having only said transfer-latency condition.

14. The method of claim 13, wherein determining a first logical volume as an active logical volume further comprises:
forming a third list including logical volumes from one of said first set and said updated first sets, said third list including logical volumes from correlated logical volume pairs on a same disk not having said transfer-latency condition.

15. The method of claim 14, wherein determining a first logical volume as an active logical volume further comprises:
sorting logical volumes of said first list firstly in accordance with access time of the disk associated with each of said logical volumes, and then, among all logical volumes residing on a same disk, in accordance with activity of said all logical volumes;
sorting logical volumes of said second list firstly in accordance with access time of the disk associated with each of said logical volumes, and then, among all logical volumes residing on a same disk, in accordance with activity of said all logical volumes;
sorting logical volumes of said third list firstly in accordance with a predetermined criteria determined for each disk associated with said third list, said predetermined criteria being based on correlation of logical volumes on said each disk and an activity level of said each disk; and
forming one of said various portions from which said first logical volume is selected by concatenating logical volumes from said first list, said second list, and said third list.

16. The method of claim 15, wherein said sorting of said third list is performed using criteria represented as:

$$\sum_{i=0}^{n}(AREAi + PEAKri) * SEEKi$$

for each conflicting pair of logical volumes, i, from 0 to n, on each disk, and then among all logical volumes from all conflicting pairs from said disk, in accordance with the activity of each logical volume.

17. The method of claim 16, wherein determining a first logical volume as an active logical volume further comprises:
selecting one of a plurality of alternate techniques for determining one of said various portions in accordance with a randomly generated number.

18. The method of claim 17, wherein determining a first logical volume as an active logical volume further comprises:
forming one of said various portions in accordance with a first technique in accordance with a first range of values associated with said randomly generated number; and
forming another of said various portions in accordance with a second different technique in accordance with a second range of values associated with said randomly generated number.

19. The method of claim 18, further comprising:
determining whether said first and second logical volumes are exchangeable in accordance with hardware criteria.

20. The method of claim 19, wherein said hardware criteria includes:
determining whether said first and second logical volumes are each associated with disks using the same bus.

21. The method of claim 20, further comprising:
determining whether sizes of said first and second logical volumes are the same.

22. The method of claim 21, further comprising:
determining if a number of conflicting pairs is reduced in accordance with past performance data if said first and second logical volumes are exchanged.

23. The method of claim 22, further comprising:
determining whether performance of said computer system is balanced in accordance with predetermined criteria;
determining whether said computer system includes striping of storage entities in which a single logical volume is partitioned in different disks; and
using an alternate technique for determining said first and second logical volumes in response to determining at least one of: said computer system is balanced and said computer system includes striping.

24. The method of claim 23, further comprising:
determining whether a number of correlated logical volume pairs in the computer system exceeds a predetermined limit; and
in response to determining that said predetermined limit is not exceeded, alternating between a plurality of alternate techniques for determining one of said various portions in accordance with a randomly generated number.

25. A computer program product for determining a pair of exchangeable logical volumes comprising:
machine executable code for determining a first logical volume as an active logical volume by incrementally examining various portions of a list of logical volumes sorted in accordance with performance data;
machine executable code for determining a second logical volume as an inactive logical volume by incrementally examining various portions of a list of logical volumes sorted in accordance with performance data; and
machine executable code for exchanging said first and said second logical volumes.

26. The computer program product of claim 25, further comprising:
machine executable code for determining, in accordance with previously gathered performance data, if said exchange of said first and second volumes will increase performance of disk devices associated with said first and second logical volumes;
wherein said machine executable code for exchanging said first and said second logical volumes is executed if it is determined that said exchange will increase performance.

27. The computer program product of claim 26, wherein said performance data includes at least one of disk access time, transfer time, latency time, seek time, correlation factors, and activity levels.

28. The computer program product of claim 27 further comprising:
machine executable code for decreasing at least one of: access time for at least one disk and a number of conflicting pairs of logical volumes in said computer system and increasing performance of said computer system in accordance with predetermined performance criteria.

29. The computer program product of claim 25 further comprising:
machine executable code for comparing a first set of active logical volume candidates with a second set of inactive logical volume candidates, said first set and said second set being determined in accordance with predetermined statistical information.

30. The computer program product of claim 29, wherein said machine executable code for determining a first logical volume as an active logical volume further comprises:
machine executable code for updating said second set of inactive logical volume candidates forming an updated second set for a predetermined number of times, said updated second set being determined in accordance with revised statistical information to add one or more logical volumes to said second set by extending thresholds of performance data; and
machine executable code, for each of said predetermined number of times, for comparing said updated second set with said first set of active logical volume candidates.

31. The computer program product of claim 30, further comprising:
machine executable code for performing said updating of said second set and said comparing said updated second set with said first set until a predetermined number of pairs of exchangeable logical volumes are determined.

32. The computer program product of claim 31, wherein said machine executable code for determining a first logical volume as an active logical volume further comprises:
machine executable code for updating said first set of inactive logical volume candidates forming an updated first set for a predetermined number of times, said updated first set being determined in accordance with revised statistical information to add one or more logical volumes to said first set by extending thresholds of performance data; and
machine executable code, for each of said predetermined number of times, for comparing said updated first set with said second set of inactive logical volume candidates.

33. The computer program product of claim 32, further comprising:
machine executable code for performing said updating of said first set and said comparing said updated first set with said second set until a predetermined number of pairs of exchangeable logical volumes are determined.

34. The computer program product of claim 32, further comprising:
machine executable code for partitioning at least one of said first set of active volume candidates and said second set of inactive volume candidates into a predetermined number of subsets, each of said subsets including logical volumes of disks being determined in accordance with different statistical parameters.

35. The computer program product of claim 34, further comprising:
machine executable code for determining one of said subsets including logical volumes having an access time less than a sum of mean access time and two standard deviations, and greater than a sum of mean access time and one standard deviation.

36. The computer program product of claim 34, further comprising:
machine executable code for determining a second of said subsets including logical volumes having an access time less than a sum of mean access time and one standard deviation, and greater than mean access time.

37. The computer program product of claim 34, wherein determining a first logical volume as an active logical volume further comprises:
machine executable code for forming a first list including logical volumes from one of said first and said updated first sets, said first list including logical volumes having a pair of correlated logical volumes on a same disk and each of said disks having a transfer-latency condition.

38. The computer program product of claim 37, wherein said transfer-latency condition includes machine executable code used in determining an under-performing disk, and said transfer latency condition being represented as:
((actual disk transfer time—minimum possible disk transfer time)>disk seek time) OR (disk latency>disk seek time).

39. The computer program product of claim 38, wherein said machine executable code for determining a first logical volume as an active logical volume further comprises:
machine executable for forming a second list including logical volumes from one of said first set and said updated first sets, said second list including logical volumes from disks having only said transfer-latency condition.

40. The computer program product of claim 39, wherein said machine executable code for determining a first logical volume as an active logical volume further comprises:

machine executable code for forming a third list including logical volumes from one of said first set and said updated first sets, said third list including logical volumes from correlated logical volume pairs on a same disk not having said transfer-latency condition.

41. The computer program product of claim 40, wherein said machine executable code for determining a first logical volume as an active logical volume further comprises:

machine executable code for sorting logical volumes of said first list firstly in accordance with access time of the disk associated with each of said logical volumes, and then, among all logical volumes residing on a same disk, in accordance with activity of said all logical volumes;

machine executable code for sorting logical volumes of said second list firstly in accordance with access time of the disk associated with each of said logical volumes, and then, among all logical volumes residing on a same disk, in accordance with activity of said all logical volumes;

machine executable code for sorting logical volumes of said third list firstly in accordance with a predetermined criteria determined for each disk associated with said third list, said predetermined criteria being based on correlation of logical volumes on said each disk and an activity level of said each disk; and machine executable code for forming one of said various portions from which said first logical volume is selected by concatenating logical volumes from said first list, said second list, and said third list.

42. The computer program product of claim 41, wherein said machine executable code for sorting of said third list further includes machine executable code for using criteria represented as:

$$\sum_{i=0}^{n}(AREAi+PEAKri)*SEEKi$$

for each conflicting pair of logical volumes, i, from 0 to n, on each disk, and then among all logical volumes from all conflicting pairs from said disk, in accordance with the activity of each logical volume.

43. The computer program product of claim 42, wherein said machine executable code for determining a first logical volume as an active logical volume further comprises:

machine executable code for selecting one of a plurality of alternate techniques for determining one of said various portions in accordance with a randomly generated number.

44. The computer program product of claim 43, wherein said machine executable code for determining a first logical volume as an active logical volume further comprises:

machine executable code for forming one of said various portions in accordance with a first technique in accordance with a first range of values associated with said randomly generated number; and machine executable code for forming another of said various portions in accordance with a second different technique in accordance with a second range of values associated with said randomly generated number.

45. The computer program product of claim 44, further comprising:

machine executable code for determining whether said first and second logical volumes are exchangeable in accordance with hardware criteria.

46. The computer program product of claim 45, wherein said hardware criteria includes:

machine executable code determining whether said first and second logical volumes are each associated with disks using the same bus.

47. The computer program product of claim 46, further comprising:

machine executable code for determining whether sizes of said first and second logical volumes are the same.

48. The computer program product of claim 47, further comprising:

machine executable code for determining if a number of conflicting pairs is reduced in accordance with past performance data if said first and second logical volumes are exchanged.

49. The computer program product of claim 48, further comprising:

machine executable code for determining whether performance of said computer system is balanced in accordance with predetermined criteria;

machine executable code for determining whether said computer system includes striping of storage entities in which a single logical volume is partitioned in different disks; and machine executable code for using an alternate technique for determining said first and second logical volumes in response to determining at least one of: said computer system is balanced and said computer system includes striping.

50. The computer program product of claim 49, further comprising:

machine executable code for determining whether a number of correlated logical volume pairs in the computer system exceeds a predetermined limit; and in response to determining that said predetermined limit is not exceeded, alternating between a plurality of alternate techniques for determining one of said various portions in accordance with a randomly generated number.

51. A method executed in a computer system for determining a pair of exchangeable logical volumes comprising:

determining a first logical volume as an active logical volume by incrementally examining various portions of a list of logical volumes sorted in accordance with a first set of performance data, said first set of performance data including correlation activity between logical volumes residing on a same disk;

determining a second logical volume as an inactive logical volume by incrementally examining various portions of a list of logical volumes sorted in accordance with a second set of performance data, said second set of performance data including low activity criteria in which activity of a logical volume is compared to a predetermined threshold of activity level; and exchanging said first and said second logical volumes.

52. The method of claim 51, wherein, upon exchanging said first and second logical volumes, the number of correlated pairs of logical volumes on a same disk that include at least one of said first and said second logical volumes decreases.

53. The method of claim 51, wherein said first set of performance data and said second set of performance data include at least one of disk transfer time, latency time, seek time, disk access time, and logical volume activity level.

54. The method of claim 53, wherein said logical volume activity level is a weighted activity level in which a weighting factor is associated with different types of data operations.

55. The method of claim 51, wherein said predetermined threshold is a first predetermined threshold, and determining a second logical volume as an inactive logical volume further comprises:

comparing an activity level of a logical volume to said predetermined threshold and determining if the activity level exceeds the first predetermined threshold a specified number of times for a defined time period;

for each occurrence exceeding the predetermined threshold, determining if the occurrence did not exceed a second threshold; and determining an inactive volume is a low activity volume if its associated activity level did not exceed the first predetermined threshold a specified number of times for a defined time period, and for each such occurrence, it is determined that a second threshold is also not exceeded.

56. The method of claim 55, wherein said determining a second logical volume as an inactive logical volume further comprises:

determining if a logical volume has zero activity level if the logical volume has no associated activity for a defined time period.

57. The method of claim 56, further comprising:

selecting a logical volume as an inactive volume if said logical volume has a zero activity level; and selecting a logical volume as an inactive volume if said logical volume is a low activity volume but not a zero activity level.

58. The method of claim 51, further comprising:

for each logical volume considered as a candidate for the active logical volume, determining if said logical volume exceeds a defined activity level for a predetermined time period.

59. The method of claim 58, wherein, for each candidate considered as an active logical volume, determining whether the candidate and another candidate reside on a same disk and whether the candidate and said other candidate have a predetermined level of correlation activity.

60. A method executed in a computer system for determining a pair of exchangeable logical volumes comprising:

determining a first logical volume as an active logical volume by examining a list of logical volumes sorted in accordance with a first set of performance data, said first set of performance data including correlation activity between logical volumes residing on a same disk;

determining a second logical volume as an inactive logical volume by examining a list of logical volumes sorted in accordance with a second set of performance data; and exchanging said first and said second logical volumes.

61. The method of claim 60, further comprising:

for each logical volume considered as a candidate for the active logical volume, determining if said each logical volume exceeds a defined activity level for a predetermined time period.

62. The method of claim 61, wherein, for each candidate considered as an active logical volume, determining whether the candidate and another candidate reside on a same disk and whether the candidate and said other candidate have a predetermined level of correlation activity.

63. The method of claim 60, wherein, upon exchanging said first and second logical volumes, correlation activity for logical volumes on a same disk that include at least one of said first and said second logical volumes decreases.

64. The method of claim 60, wherein said first and said second sets of performance data include at least one of disk transfer time, latency time, disk access time, and logical volume activity.

65. The method of claim 64, wherein said logical volume activity level is a weighted activity level in which a weighting factor is associated with different types of data operations.

66. A method executed in a computer system for determining a pair of exchangeable logical volumes comprising:

determining a first logical volume as an active logical volume by examining a list of logical volumes sorted in accordance with a first set of performance data;

determining a second logical volume as an inactive logical volume by examining a list of logical volumes sorted in accordance with a second set of performance data, said second set of performance data including low activity criteria in which activity of a logical volume is compared to a predetermined threshold of activity level; and exchanging said first and said second logical volumes.

67. The method of claim 66, wherein said first and said second sets of performance data include at least one of disk transfer time, latency time, disk access time, and logical volume activity.

68. The method of claim 67, wherein said logical volume activity level is a weighted activity level in which a weighting factor is associated with different types of data operations.

69. The method of claim 66, wherein said predetermined threshold is a first predetermined threshold, and determining a second logical volume as an inactive logical volume further comprises:

comparing an activity level of a logical volume to said predetermined threshold and determining if the activity level exceeds the first predetermined threshold a specified number of times for a defined time period;

for each occurrence exceeding the predetermined threshold, determining if the occurrence did not exceed a second threshold; and determining an inactive volume is a low activity volume if its associated activity level did not exceed the first predetermined threshold a specified number of times for a defined time period, and for each such occurrence, it is determined that a second threshold is also not exceeded.

70. The method of claim 69, wherein said determining a second logical volume as an inactive logical volume further comprises:

determining if a logical volume has zero activity level if the logical volume has no associated activity for a defined time period.

71. The method of claim 70, further comprising:

selecting a logical volume as an inactive volume if said logical volume has a zero activity level; and selecting a logical volume as an inactive volume if said logical volume is a low activity volume but not a zero activity level.

72. A computer program product for determining a pair of exchangeable logical volumes comprising:
- machine executable code for determining a first logical volume as an active logical volume by incrementally examining various portions of a list of logical volumes sorted in accordance with a first set of performance data, said first set of performance data including correlation activity between logical volumes residing on a same disk;
- machine executable code for determining a second logical volume as an inactive logical volume by incrementally examining various portions of a list of logical volumes sorted in accordance with a second set of performance data, said second set of performance data including low activity criteria in which activity of a logical volume is compared to a predetermined threshold of activity level; and
- machine executable code for exchanging said first and said second logical volumes.

73. The computer program product of claim 72, wherein, upon exchanging said first and second logical volumes, correlation activity for logical volumes on a same disk that include at least one of said first and said second logical volumes decreases.

74. The computer program product of claim 72, wherein said first set of performance data and said second set of performance data include at least one of disk transfer time, latency time, seek time, disk access time, and logical volume activity level.

75. The computer program product of claim 74, wherein said logical volume activity level is a weighted activity level in which a weighting factor is associated with different types of data operations.

76. The computer program product of claim 72, wherein said predetermined threshold is a first predetermined threshold, and said machine executable code for determining a second logical volume as an inactive logical volume further comprises:
- machine executable code for comparing an activity level of a logical volume to said predetermined threshold and determining if the activity level exceeds the first predetermined threshold a specified number of times for a defined time period;
- machine executable code, for each occurrence exceeding the predetermined threshold, for determining if the occurrence did not exceed a second threshold; and
- machine executable code for determining an inactive volume is a low activity volume if its associated activity level did not exceed the first predetermined threshold a specified number of times for a defined time period, and for each such occurrence, it is determined that a second threshold is also not exceeded.

77. The computer program product of claim 76, wherein said machine executable code for determining a second logical volume as an inactive logical volume further comprises:
- machine executable code for determining if a logical volume has zero activity level if the logical volume has no associated activity for a defined time period.

78. The computer program product of claim 77, further comprising:
- machine executable code for selecting a logical volume as an inactive volume if said logical volume has a zero activity level; and
- machine executable code for selecting a logical volume as an inactive volume if said logical volume is a low activity volume but not a zero activity level.

79. The computer program product of claim 72, further comprising:
- machine executable code, for each logical volume considered as a candidate for the active logical volume, for determining if said each logical volume exceeds a defined activity level for a predetermined time period.

80. The computer program product of claim 79, further comprising machine executable code, wherein, for each candidate considered as an active logical volume, for determining whether the candidate and another candidate reside on a same disk and whether the candidate and said other candidate have a predetermined level of correlation activity.

81. A computer program product for determining a pair of exchangeable logical volumes comprising:
- machine executable code for determining a first logical volume as an active logical volume by examining a list of logical volumes sorted in accordance with a first set of performance data, said first set of performance data including correlation activity between logical volumes residing on a same disk;
- machine executable code for determining a second logical volume as an inactive logical volume by examining a list of logical volumes sorted in accordance with a second set of performance data; and
- machine executable code for exchanging said first and said second logical volumes.

82. The computer program product of claim 81, further comprising:
- machine executable code, for each logical volume considered as a candidate for the active logical volume, for determining if said each logical volume exceeds a defined activity level for a predetermined time period.

83. The computer program product of claim 82, further comprising machine executable code, wherein, for each candidate considered as an active logical volume, for determining whether the candidate and another candidate reside on a same disk and whether the candidate and said other candidate have a predetermined level of correlation activity.

84. The computer program product of claim 81, wherein, upon exchanging said first and second logical volumes, correlation activity for logical volumes on a same disk that include at least one of said first and said second logical volumes decreases.

85. The computer program product of claim 81, wherein said first and said second sets of performance data include at least one of disk transfer time, latency time, disk access time, and logical volume activity.

86. A computer program product for determining a pair of exchangeable logical volumes comprising:
- machine executable code for determining a first logical volume as an active logical volume by examining a list of logical volumes sorted in accordance with a first set of performance data;
- machine executable code for determining a second logical volume as an inactive logical volume by examining a list of logical volumes sorted in accordance with a second set of performance data, said second set of performance data including low activity criteria in which activity of a logical volume is compared to a predetermined threshold of activity level; and
- machine executable code for exchanging said first and said second logical volumes.

87. The computer program product of claim 86, wherein said first and said second sets of performance data include at least one of disk transfer time, latency time, disk access time, and logical volume activity.

88. The computer program product of claim 87, wherein said logical volume activity level is a weighted activity level in which a weighting factor is associated with different types of data operations.

89. The computer program product of claim 86, wherein said predetermined threshold is a first predetermined threshold, and said machine executable code for determining a second logical volume as an inactive logical volume further comprises:

- machine executable code for comparing an activity level of a logical volume to said predetermined threshold and determining if the activity level exceeds the first predetermined threshold a specified number of times for a defined time period;
- machine executable code, for each occurrence exceeding the predetermined threshold, for determining if the occurrence did not exceed a second threshold; and
- machine executable code for determining an inactive volume is a low activity volume if its associated activity level did not exceed the first predetermined threshold a specified number of times for a defined time period, and for each such occurrence, it is determined that a second threshold is also not exceeded.

90. The computer program product of claim 89, wherein said machine executable code for determining a second logical volume as an inactive logical volume further comprises:

- machine executable code for determining if a logical volume has zero activity level if the logical volume has no associated activity for a defined time period.

91. The computer program product of claim 90, further comprising:

- machine executable code for selecting a logical volume as an inactive volume if said logical volume has a zero activity level; and
- machine executable code for selecting a logical volume as an inactive volume if said logical volume is a low activity volume but not a zero activity level.

* * * * *

UNITED STATES PATENT AND TRADEMARK OFFICE
CERTIFICATE OF CORRECTION

PATENT NO. : 6,671,774 B1
DATED : December 30, 2003
INVENTOR(S) : Lam et al.

It is certified that error appears in the above-identified patent and that said Letters Patent is hereby corrected as shown below:

<u>Title page,</u>
Item [75], Inventors, "Orit Levin Michael" should read -- Orit Levin-Michael --.

Signed and Sealed this

Twenty-ninth Day of June, 2004

JON W. DUDAS
*Acting Director of the United States Patent and Trademark Office*